United States Patent
Li et al.

(10) Patent No.: US 11,630,510 B2
(45) Date of Patent: Apr. 18, 2023

(54) SYSTEM, METHOD AND STORAGE MEDIUM FOR 2D ON-SCREEN USER GAZE ESTIMATION

(71) Applicant: Huawei Technologies Co., Ltd., Shenzhen (CN)

(72) Inventors: Zhenhao Li, Markham (CA); Rasoul Mohammadi Nasiri, Toronto (CA); Zheng Liu, Toronto (CA); Hisham Elhalabi, Brampton (CA); Yuanhao Yu, Markham (CA); Roel Vertegaal, Perth Road (CA); Yang Wang, Winnipeg (CA); Jin Tang, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/304,615

(22) Filed: Jun. 23, 2021

(65) Prior Publication Data
US 2022/0413602 A1    Dec. 29, 2022

(51) Int. Cl.
*G06F 3/01* (2006.01)
*G06T 7/80* (2017.01)
(Continued)

(52) U.S. Cl.
CPC ............... *G06F 3/013* (2013.01); *G06T 7/80* (2017.01); *G06T 17/20* (2013.01); *G06V 40/171* (2022.01); *G06F 3/012* (2013.01)

(58) Field of Classification Search
CPC . G06F 3/013; G06F 3/012; G06T 7/80; G06T 17/20; G06V 40/171
(Continued)

(56) References Cited

U.S. PATENT DOCUMENTS

| 9,829,976 B2 | 11/2017 | Algotsson et al. |
| 9,864,430 B2 | 1/2018 | Wu et al. |

(Continued)

FOREIGN PATENT DOCUMENTS

| CN | 106659380 A | 5/2017 |
| CN | 112667069 A | 4/2021 |

(Continued)

OTHER PUBLICATIONS

Papoutsaki, A et al. Webgazer: Scalable Webcam Eye Tracking Using User Interactions. 25th International Joint Conference on Artificial Intelligence (IJCAI 2016).
(Continued)

*Primary Examiner* — Jimmy H Nguyen
(74) *Attorney, Agent, or Firm* — Slater Matsil, LLP

(57) ABSTRACT

A system and a method for performing 2D on-screen user gaze estimation using an input facial image of a user captured using a camera associated to a processing device having a display. The method and system allow automated user calibration through automatic recording of calibration samples each including a calibration facial image of the user and an interaction point corresponding to a point on the display where an occurrence of a user interaction was detected when the corresponding calibration image was captured. The system and method also optimize user-specific parameters using the calibration samples by iteratively minimizing a total difference between the interaction points of a plurality of the calibration samples and corresponding 2D gaze estimation results and convert an estimated 3D gaze direction into a 2D gaze estimation result corresponding to a point on the display, by applying the users-specific parameters.

20 Claims, 9 Drawing Sheets

(51) Int. Cl.
  G06T 17/20     (2006.01)
  G06V 40/16     (2022.01)
(58) Field of Classification Search
  USPC .......................................................... 345/156
  See application file for complete search history.

(56)            References Cited

U.S. PATENT DOCUMENTS

| 10,664,699 | B2 | 5/2020 | Invernizzi |
| 10,817,721 | B2 | 10/2020 | Wilson |
| 11,003,245 | B2 | 5/2021 | Liu et al. |
| 2014/0204193 | A1 | 7/2014 | Zhang et al. |
| 2016/0202756 | A1* | 7/2016 | Wu ........................ G06F 3/0304 382/103 |
| 2019/0303724 | A1* | 10/2019 | Linden ................. G06K 9/6262 |
| 2020/0012516 | A1 | 1/2020 | Kodama et al. |
| 2021/0042520 | A1* | 2/2021 | Molin .................... G06N 3/084 |
| 2021/0374402 | A1* | 12/2021 | Kim ..................... G06V 40/161 |
| 2022/0050521 | A1* | 2/2022 | Drozdov ............... G06T 7/0012 |

FOREIGN PATENT DOCUMENTS

| EP | 3789848 A1 | 3/2021 | |
| WO | 2015186054 A1 | 12/2015 | |
| WO | 2019199035 A1 | 10/2019 | |
| WO | WO-2020110121 A1 * | 6/2020 | ............. A61B 3/113 |

OTHER PUBLICATIONS

Wu, Haiyuan, Qian Chen, and Toshikazu Wada. "Conic-based algorithm for visual line estimation from one image." Sixth IEEE International Conference on Automatic Face and Gesture Recognition, 2004. Proceedings.. IEEE, 2004.
Hansen, Dan Witzner, and Qiang Ji. "In the eye of the beholder: A survey of models for eyes and gaze." IEEE transactions on pattern analysis and machine intelligence 32.3 (2009): 478-500.
Reale, Michael, Terry Hung, and Lijun Yin. "Viewing direction estimation based on 3D eyeball construction for HRI." 2010 IEEE Computer Society Conference on Computer Vision and Pattern Recognition-Workshops. IEEE, 2010.
Alnajar, Fares, et al. "Calibration-free gaze estimation using human gaze patterns." Proceedings of the IEEE International conference on computer vision. 2013.
Smith, Brian A., et al. "Gaze locking: passive eye contact detection for human-object interaction." Proceedings of the 26th annual ACM symposium on User interface software and technology. 2013.
Lu, Feng, et al. "Adaptive linear regression for appearance-based gaze estimation." IEEE transactions on pattern analysis and machine intelligence 36.10 (2014): 2033-2046.
Baek, Seung-Jin, et al. "Eyeball model-based iris center localization for visible image-based eye-gaze tracking systems." IEEE Transactions on Consumer Electronics 59.2 (2013): 415-421.
Sugano, Yusuke, Yasuyuki Matsushita, and Yoichi Sato. "Learning-by-synthesis for appearance-based 3d gaze estimation." Proceedings of the IEEE Conference on Computer Vision and Pattern Recognition. 2014.
Wood, Erroll, and Andreas Bulling. "Eyetab: Model-based gaze estimation on unmodified tablet computers." Proceedings of the Symposium on Eye Tracking Research and Applications. 2014.
Wood, Erroll, et al. "Rendering of eyes for eye-shape registration and gaze estimation." Proceedings of the IEEE International Conference on Computer Vision. 2015.
Huang, Michael Xuelin, et al. "Building a personalized, auto-calibrating eye tracker from user interactions." Proceedings of the 2016 CHI Conference on Human Factors in Computing Systems. 2016.
Wood, Erroll, et al. "Learning an appearance-based gaze estimator from one million synthesised images." Proceedings of the Ninth Biennial ACM Symposium on Eye Tracking Research & Applications. 2016.

Zhang, Xucong, et al. "Mpiigaze: Real-world dataset and deep appearance-based gaze estimation." IEEE transactions on pattern analysis and machine intelligence 41.1 (2017): 162-175.
Papoutsaki, Alexandra, James Laskey, and Jeff Huang. "Searchgazer: Webcam eye tracking for remote studies of web search " Proceedings of the 2017 Conference on Conference Human Information Interaction and Retrieval. 2017.
Rafka, Kyle, et al. "Eye tracking for everyone." Proceedings of the IEEE conference on computer vision and pattern recognition. 2016.
Shrivastava, Ashish, et al. "Learning from simulated and unsupervised images through adversarial training." Proceedings of the IEEE conference on computer vision and pattern recognition. 2017.
Zhang, Xucong, et al. "It's written all over your face: Full-face appearance-based gaze estimation." Proceedings of the IEEE Conference on Computer Vision and Pattern Recognition Workshops. 2017.
Zhu, Wangjiang, and Haoping Deng. "Monocular free-head 3d gaze tracking with deep learning and geometry constraints." Proceedings of the IEEE International Conference on Computer Vision. 2017.
Huang, Qiong, Ashok Veeraraghavan, and Ashutosh Sabharwal. "TabletGaze: dataset and analysis for unconstrained appearance-based gaze estimation in mobile tablets." Machine Vision and Applications 28.5 (2017): 145-461.
Wu, Dijia, et al. "Gaze tracking via eye gaze model." U.S. Pat. No. 9,864,430. Jan. 9, 2018.
Zhang, Xucong, et al. "Training person-specific gaze estimators from user interactions with multiple devices." Proceedings of the 2018 CHI Conference on Human Factors in Computing Systems. 2018.
Wang, Kang, Rui Zhao, and Qiang Ji. "A hierarchical generative model for eye image synthesis and eye gaze estimation." Proceedings of the IEEE Conference on Computer Vision and Pattern Recognition. 2018.
Ranjan, Rajeev, Shalini De Mello, and Jan Kautz. "Light-weight head pose invariant gaze tracking." Proceedings of the IEEE Conference on Computer Vision and Pattern Recognition Workshops. 2018.
Park, Seonwook, Adrian Spurr, and Otmar Hilliges. "Deep pictorial gaze estimation." Proceedings of the European Conference on Computer Vision (ECCV). 2018.
Fischer, Tobias, Hyung Jin Chang, and Yiannis Demiris. "Rt-gene: Real-time eye gaze estimation in natural environments." Proceedings of the European Conference on Computer Vision (ECCV). 2018.
Cheng, Yihua, Feng Lu, and Xucong Zhang. Appearance-based gaze estimation via evaluation-guided asymmetric regression.
Yu, Yu, Gang Liu, and Jean-Marc Odobez. "Deep multitask gaze estimation with a constrained landmark-gaze model." Proceedings of the European Conference on Computer Vision (ECCV) Workshops. 2018.
Baltrusaitis, Tadas, et al. "Openface 2.0: Facial behavior analysis toolkit." 2018 13th IEEE International Conference on Automatic Face & Gesture Recognition (FG 2018). IEEE, 2018.
Liu, Gang, et al. "A differential approach for gaze estimation." IEEE transactions on pattern analysis and machine intelligence (2019).
Xiong, Yunyang, Hyunwoo J. Kim, and Vikas Singh. "Mixed effects neural networks (menets) with applications to gaze estimation." Proceedings of the IEEE/CVF Conference on Computer Vision and Pattern Recognition. 2019.
Park, Seonwook, et al. "Few-shot adaptive gaze estimation." Proceedings of the IEEE/CVF International Conference on Computer Vision. 2019.
Yu, Yu, Gang Liu, and Jean-Marc Odobez. "Improving few-shot user-specific gaze adaptation via gaze redirection synthesis" Proceedings of the IEEE/CVF Conference on Computer Vision and Pattern Recognition. 2019.
He, Junfeng, et al. "On-device few-shot personalization for real-time gaze estimation." Proceedings of the IEEE/CVF International Conference on Computer Vision Workshops. 2019.
Lindén, Erik, Jonas Sjostrand, and Alexandre Proutiere. "Learning to personalize in appearance-based gaze tracking." Proceedings of the IEEE/CVF International Conference on Computer Vision Workshops. 2019.

(56) References Cited

OTHER PUBLICATIONS

Guo, Tianchu, et al. "A Generalized and Robust Method Towards Practical Gaze Estimation on Smart Phone." Proceedings of the IEEE/CVF International Conference on Computer Vision Workshops. 2019.

Yu, Yu, and Jean-Marc Odobez. "Unsupervised representation learning for gaze estimation." Proceedings of the IEEE/CVF Conference on Computer Vision and Pattern Recognition. 2020.

Zhang, Xucong, et al. "ETH-XGaze: A Large Scale Dataset for Gaze Estimation under Extreme Head Pose and Gaze Variation." European Conference on Computer Vision. Springer, Cham, 2020.

* cited by examiner

SYSTEM, METHOD AND STORAGE MEDIUM FOR 2D ON-SCREEN USER GAZE ESTIMATION

TECHNICAL FIELD OF THE INVENTION

The present invention relates to the field of computer vision. More particularly, it relates to the field of gaze estimation allowing estimation of a point of regard (PoR) of a user on a display screen, from an image of the user gazing at the screen.

BACKGROUND

Gaze estimation in the field of computer vision is directed to determination of a point of regard (PoR) of a user from user images (i.e. identification of the position of a point in 3D space or a 2D screen surface upon which the sight of the user is directed) from user images, for example, through analysis of eye features, facial features and/or head positioning of the user in user images. In many instances, gaze estimation can provide valuable insights pertaining to the attention, behavior and/or cognition of the user. Consequently, gaze estimation can be used in a wide variety of applications, such as, for example and without being limitative, human-computer interaction (HCI) tools where the estimated gaze of a user is used to guide user interactions with corresponding computing devices, user attention analysis, augmented reality applications, etc. In view of the above, gaze estimation has received significant interest in recent years.

For example, a number of consumer-level gaze tracking systems, which perform gaze estimation, have been developed. Gaze tracking systems typically include multiple head-mounted cameras or multiple cameras fixed to surfaces such as, red-green-blue (RGB) cameras, near-infrared (NIR) cameras, time-of-flight (ToF) cameras, etc, and one or more display screens. The cameras of the gaze tracking system are used to capture user images as the user interacts with the one or more display screens, Gaze tracking systems, however, tend to have a high cost and to offer poor inter-device compatibility, as gaze tracking systems are designed to work with specific computing devices connections and controls (i.e. gaze tracking systems commonly rely on specific computing devices software and/or driver). Moreover, known gaze tracking systems commonly require explicit calibration procedures to be performed to estimate user-specific data that are needed for the determination of the PoR of a user from user images, prior to usage thereof. The explicit calibration procedures typically require the user to gaze at a number of points on the one or more display screens, while the cameras of the gaze tracking system capture user images and the gaze tracking system collects gaze data used for calibration, thereby negatively impacting the user experience.

Alternative techniques have been proposed to limit the costs of gaze estimation. One such technique involves performing gaze estimation using only user mages captured by RGB cameras only, given that RGB cameras are usually cheaper and readily offered on computing devices such as, for example, smartphones, tablets, or the like. Using this technique, studies have proposed for performing gaze estimation by performing reconstruction of the 3D eyeball and/or an iris of eye of a user by processing one or more user images captured by a RGB camera. However, this technique tends to generate a PoR of the user that suffers from a precision issue because performing reconstruction of the 3D eyeball and/or an iris of eye of a user by processing one or more user images captured by a single RGB camera relies on detection of an iris or pupil of a user in the one or more user images that may be captured using different types of RGB cameras and under varying lighting conditions.

Deep learning methods for 3D gaze estimation have been proposed which directly estimates a 3D gaze of the user (i.e. the direction of a line of sight for the user) from user images captured by one or more cameras. From a practical point of view, the use of an estimated 3D gaze of a user is however less relevant in several instances than an estimation of a 2D gaze of a user, as the use of 3D gaze estimation can limit the practical use of the estimation gaze data, for example in HCI applications. Deep learning models can also be used to estimate 2D gaze directly, without explicit 3D gaze estimation. However, direct 2D gaze estimation models tend to have poorer generalization ability than 3D gaze models, because the 2D gaze estimation models are implicitly required to learn both the 3D geometry parameters (e.g. orientation and position of a head of a user) and camera intrinsic parameters from a specific training dataset. Hence, such 2D estimation gaze models tend to provide satisfactory results on domains similar to that of the training dataset, but can hardly be extended to other domains, such as, different devices and/or different user positions from those of the training dataset.

Finally, as is the case with the above-described consumer-level gaze tracking systems, 2D gaze estimation models which generate an estimate of a 2D gaze of a user from user images captured by a camera, require calibration for the user in order to provide an accurate estimate of the 2D gaze of a user, for instance due to the variabilities in eye shapes and/or physiological eye structures amongst individuals. Indeed, studies have shown that 2D gaze estimation models have limited accuracy (e.g. cannot achieve an accuracy greater than approximately a 4° or 5° angular error) without performing a user-specific calibration procedure for the specific user. Known possible user-specific calibrations procedures include the above-mentioned use of calibration datasets gathered using explicit calibration procedures which are detrimental to the user experience. Implicit calibration where user interactions are used to collect calibration points (i.e. acquiring a 2D gaze point at an interaction point on the display screen (e.g. cursor position or tapping point position), whenever a user interacts with a computing device with a click a mouse, a touch of a touch screen, etc.) are also known. However, known explicit calibration procedures tend to suffer from several drawbacks, limiting the practical use thereof in real time applications. Indeed, known explicit calibration procedures either assume that the user's face is frontal and located directly in front of the camera in the captured images, without providing mechanisms to ensure such assumptions are met, thereby limiting the practical usage thereof, or is require 2D-to-3D mapping which can introduce estimation errors reducing the accuracy of the calibration.

In view of the above, there is therefore a need for systems and/or methods for performing gaze estimation which overcome or at least minimize some of the above-discussed limitations of know gaze estimation systems and methods.

BRIEF SUMMARY OF THE INVENTION

The present disclosure provides a method and/or system for performing gaze estimation and/or a non-transitory computer readable medium having instructions stored thereon which, when executed by a processor, cause the processor to carry out the method for performing gaze estimation.

In a first aspect, present application provides a system for performing gaze estimation. The system comprises a 3D gaze estimation module configured to estimate a 3D gaze direction from either an input facial image of a user captured using a camera associated with a processing device having a display or a calibration facial image, and a 3D to 2D projection module configured to use user-specific parameters to convert the estimated 3D gaze direction into a 2D gaze estimation result corresponding to a user's estimated point of regard on the display. The system also comprises a calibration data collection module configured to record calibration samples. The calibration samples each include a calibration facial image of the user and an interaction point corresponding to a point on the display where an occurrence of a user interaction was detected when the corresponding calibration image was captured. The system also comprises a user-specific parameter optimization module configured to optimize the user-specific parameters using the calibration samples. The user-specific parameter optimization module optimizes the user-specific parameters by iteratively minimizing a total difference between the interaction points of a plurality of the calibration samples and the corresponding 2D gaze estimation results in iterations. The total difference between the interaction points of a plurality of the calibration samples and the corresponding 2D gaze estimation results is obtained by using the 3D gaze estimation module and the 3D to 2D projection module for the corresponding calibration facial images of the plurality of calibration samples.

By optimizing the user-specific parameters, the system can convert the estimated 3D gaze direction into a 2D gaze estimation result with greater accuracy for the specific user for which the gaze estimation is performed.

According to a first implementation of the system according to the first aspect, the calibration data collection module is configured to include one or more of the calibration samples into a training dataset and one or more of the calibration samples in a validation dataset. The user-specific parameter optimization module is configured to iteratively minimize the total difference between the interaction points of the plurality of the calibration samples and the corresponding 2D gaze estimation results by iteratively minimizing the total difference between the interaction points of the calibration samples and the corresponding 2D gaze estimation results of the training dataset in iterations and terminating the iterations when the difference between the interaction points of the calibration samples and the corresponding 2D gaze estimation results of the validation dataset no longer decreases. Thus, the user-specific parameter optimization module determines the user-specific parameters making the 2D gaze estimation results as close to the corresponding ground truth values as possible, while avoiding overfitting.

According to a second implementation of the system according to the first implementation, the calibration data collection module is configured to populate a calibration dataset with the recorded calibration samples and to partition the calibration dataset into the training dataset and the validation dataset, when a new sample is added and the number of calibration samples exceeds two. The user-specific parameter optimization module updates the user-specific parameters upon an update of the training dataset and the validation dataset by repeating the iterations from an end of a last iteration performed for optimizing the user-specific parameters. Thus, the user-specific parameter optimization module minimizes the number of iterations required to converge towards the optimized user-specific parameters.

According to a third implementation of the system according to any of the preceding implementations, the at least one of the user-specific parameters can be transmitted to a target processing device having a similar user-specific parameter optimization module stored in a memory thereof. Thus, this allows the user-specific parameter optimization module of the target processing device to minimize the iterations required for performing optimization of the user-specific parameters.

According to a fourth implementation of the system according to any of the preceding implementations, the system further comprises a 3D face mesh generation module for generating a user-specific 3D face mesh, from a set of reference facial images of the user. The 3D face mesh generation module repeatedly processes one of the reference facial images and generate coordinates of a set of 3D facial landmarks and performs a series of linear transformation operations upon the coordinates of the set of 3D facial landmarks. The series of linear transformation operations include at least one of a translation, a rotation and a scaling of the 3D facial landmarks to generate normalized facial landmarks. The user-specific 3D face mesh is generated based on the normalized facial landmarks. The user-specific 3D face mesh is used when generating head pose data including a position vector and a rotation matrix of the user's head, which are in turn used by the 3D to 2D projection module to convert the estimated 3D gaze direction into the 2D gaze estimation result. Therefore, the determination of the user-specific 3D face mesh and the use of the user-specific 3D face mesh for generating the head pose data once again allows to convert the estimated 3D gaze direction into a 2D gaze estimation result with greater accuracy for the specific user for which the gaze estimation is performed.

According to a fifth implementation of the system according to the fourth implementation, the 3D face mesh generation module is configured to perform the scaling of the 3D facial landmarks by applying a scaling factor corresponding to a value of a facial feature for the user determined from the set of 3D facial landmarks relative to a value of the facial feature for the average human head, the scaling factor being determined at least by one of the value of the inter-pupillary distance (IPD) for the user relative to the inter-pupillary distance (IPD) for the average human head and the value of the iris diameter for the user relative to the iris diameter of the average human head. Thus this allows to scale the head defined by the 3D facial landmarks of the corresponding image to match an average human head, thereby compensating for possible inconsistencies in the distance between the user and the camera in the reference images.

According to a sixth implementation of the system according to any of the preceding implementations, the 3D to 2D projection module is configured to determine the 2D gaze estimation result based on a combination of two estimated gaze directions corresponding to a left eye and a right eye of the user respectively. The user-specific parameters are adapted to take into account the two estimated gaze directions corresponding to the left eye and the right eye of the user. Thus, this allows a greater flexibility to the system that allows the system to also operate in a mode where two estimated gaze directions corresponding to a left eye and a right eye of the user are provided.

In a second aspect, present application provides a method for performing gaze estimation. The processing device detects user interactions with a display of the processing device and captures calibration facial images of a user corresponding to a detected user interaction, using a camera associated with the processing device. The processing device records calibration samples comprising one of the calibration facial images and an interaction point corresponding to a point on the display where the user interaction was detected when the calibration image was captured. The processing device also optimizes user-specific parameters using the calibration samples by iteratively minimizing a total difference between the interaction points of a plurality of the calibration samples and the corresponding 2D gaze estimation results obtained by using the user-specific parameters to convert calibration 3D gaze directions estimated from corresponding calibration facial images of the plurality of calibration samples. The processing device receives an input facial image of the user captured using the camera and generates an estimated input 3D gaze directions therefrom, and converts the estimated input 3D gaze direction into an input 2D gaze estimation result corresponding to a user's estimated point of regard on the display for the input facial image, by applying the user-specific parameters.

By generating and optimizing the user-specific parameters, the system can apply the most accurate user-specific parameters when converting the estimated 3D gaze direction into a 2D gaze estimation result, thereby yielding a greater accuracy for the specific user for which the gaze estimation is performed.

According to a first implementation of the method according to the second aspect, the method comprises including one or more of the calibration samples into a training dataset and including one or more of the calibration samples into a validation dataset. Iteratively minimizing the total difference between the interaction points of the plurality of the calibration samples and corresponding 2D gaze estimation results in iterations includes iteratively minimizing the total difference between the interaction points of the calibration samples and corresponding 2D gaze estimation results of the training dataset in iterations and terminating the iterations when the difference between the interaction points of the calibration samples and corresponding 2D gaze estimation results of the validation dataset no longer decreases. Thus, the method yields 2D gaze estimation results as close to the corresponding ground truth values as possible, while avoiding overfitting.

According to a second implementation of the method according to the first implementation, the method includes populating a calibration dataset with the recorded calibration samples and partitioning the calibration dataset into the training dataset and the validation dataset, when a new sample is added and the number of calibration samples exceeds two. The method further includes updating the user-specific parameters upon an update of the training dataset and the validation dataset by repeating the iterations from an end of a last iteration performed for optimizing the user-specific parameters. Thus, the method minimizes the number of iterations required to converge towards the optimized user-specific parameters.

According to a third implementation of the method according to any of the preceding implementations, the at least one of the user-specific parameters can be transmitted to a target processing device having instructions stored in a memory thereof which, when executed by a processor, can perform the step of optimizing the user-specific parameters using the calibration samples. Thus, this allows to minimize the iterations required for performing the step of optimizing the user-specific parameters using the calibration samples on the target processing device.

According to a fourth implementation of the method according to any of the preceding implementations, the method further comprises generating a user-specific 3D face mesh. Generation of the user-specific 3D face mesh includes, for each one of a set of reference facial images: processing the reference facial image and generating coordinates of a set of 3D facial landmarks; and performing a series of linear transformation operations upon the coordinates of the set of 3D facial landmarks, to generate normalized facial landmarks. The series of linear transformation operations includes at least one of a translation, a rotation and a scaling of the 3D facial landmarks. The method includes generating the user-specific 3D face mesh based on the normalized facial landmarks. The user-specific 3D face mesh is used when generating head pose data including a position vector and a rotation matrix of the user's head, used in turn to convert the estimated 3D gaze direction into the 2D gaze estimation result. Therefore, the determination of the user-specific 3D face mesh and the use of the user-specific 3D face mesh for generating the head pose data allows to convert the estimated 3D gaze direction into a 2D gaze estimation result with greater accuracy for the specific user for which the gaze estimation is performed.

According to a fifth implementation of the method according to the fourth implementation of the method, performing the scaling of the 3D facial landmarks includes applying a scaling factor corresponding to a value of a facial feature for the user determined from the set of 3D facial landmarks relative to a value of the facial feature for the average human head. The scaling factor can be determined at least by one of the value of the inter-pupillary distance (IPD) for the user relative to the inter-pupillary distance (IPD) for the average human head and the value of the iris diameter for the user relative to the iris diameter for the average human head. Thus this allows to scale the head defined by the 3D facial landmarks of the corresponding image to match an average human head, thereby compensating for possible inconsistencies in the distance between the user and the camera in the reference images.

According to a sixth implementation of the method according to any of the preceding implementations, receiving the input facial image and generating an estimated input 3D gaze directions therefrom comprises generating two estimated gaze directions corresponding to a left eye and a right eye of the user respectively. The step of converting the estimated input 3D gaze direction into an input 2D gaze estimation result comprises converting the two estimated gaze directions into a left eye input 2D gaze estimation result and a right eye input 2D gaze estimation result and generating the 2D gaze estimation result from the combination of the left eye input 2D gaze estimation result and the right eye input 2D gaze estimation result. Thus, this allows a greater flexibility to the system that allows the system to also operate in a mode where two estimated gaze directions corresponding to a left eye and a right eye of the user are provided.

In a third aspect, present application provides a non-transitory computer readable medium having instructions stored thereon which, when executed by a processor, cause the processor to carry out the method for performing the method of the second aspect.

In a fourth aspect, the present application provides a system for performing gaze estimation. The system comprises a 3D gaze estimation module configured to estimate a 3D gaze direction from an input facial image of a user captured using a camera associated with a processing device having a display and a 3D to 2D projection module configured to apply user-specific parameters to convert the estimated 3D gaze direction into a 2D gaze estimation result corresponding to a user's estimated point of regard on the display. The system also comprises a 3D face mesh generation module for generating a user-specific 3D face mesh, from a set of reference facial images of the user. The 3D face mesh generation module repeatedly processes one of the reference facial images and generate coordinates of a set of 3D facial landmarks and performs a series of linear transformation operations upon the coordinates of the set of 3D facial landmarks. The series of linear transformation operations include at least one of a translation, a rotation and a scaling of the 3D facial landmarks to generate normalized facial landmarks. The user-specific 3D face mesh is generated based on the normalized facial landmarks. The system also includes a head pose detection module generating head pose data including a position vector and a rotation matrix of the user's head using the user-specific 3D face mesh. The 3D to 2D projection module converts the estimated 3D gaze direction into the 2D gaze estimation result by applying the position vector and the rotation matrix.

By generating the user-specific 3D face mesh and using the user-specific 3D face mesh for generating the head pose data, the system converts the estimated 3D gaze direction into a 2D gaze estimation result with greater accuracy for the specific user for which the gaze estimation is performed.

In a fifth aspect, present application provides a method for performing gaze estimation using an input facial image of a user captured using a camera associated with a processing device having a display. For each one of a set of reference images, the processing device processes the reference facial image and generates coordinates of a set of 3D facial landmarks. The processing device also performs a series of linear transformation operations upon the coordinates of the set of 3D facial landmarks including at least one of a translation, a rotation and a scaling of the 3D facial landmarks to generate normalized facial landmarks. The processing device generates the user-specific 3D face mesh based on the normalized facial landmarks generated for the set of reference images. The processing device further generates head pose data including a position vector and a rotation matrix of the user's head using the user-specific 3D face mesh and converts an estimated 3D gaze direction into a 2D gaze estimation result by applying the position vector and the rotation matrix.

In a sixth aspect, present application provides a non-transitory computer readable medium having instructions stored thereon which, when executed by a processor, cause the processor to carry out the method for performing the method of the fifth aspect.

Present application provides improved method, system and non-transitory memory storing instructions storing instruction for carrying out the method when executed by a processor, which advantageously improve 2D gaze estimation over existing technologies since they allow at least one of automatic construction of a user-specific face mesh and automatic collection of calibration data for determining and updating user specific parameter sets used for adjusting the conversion of an estimated 3D gaze direction into a 2D gaze estimation result.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
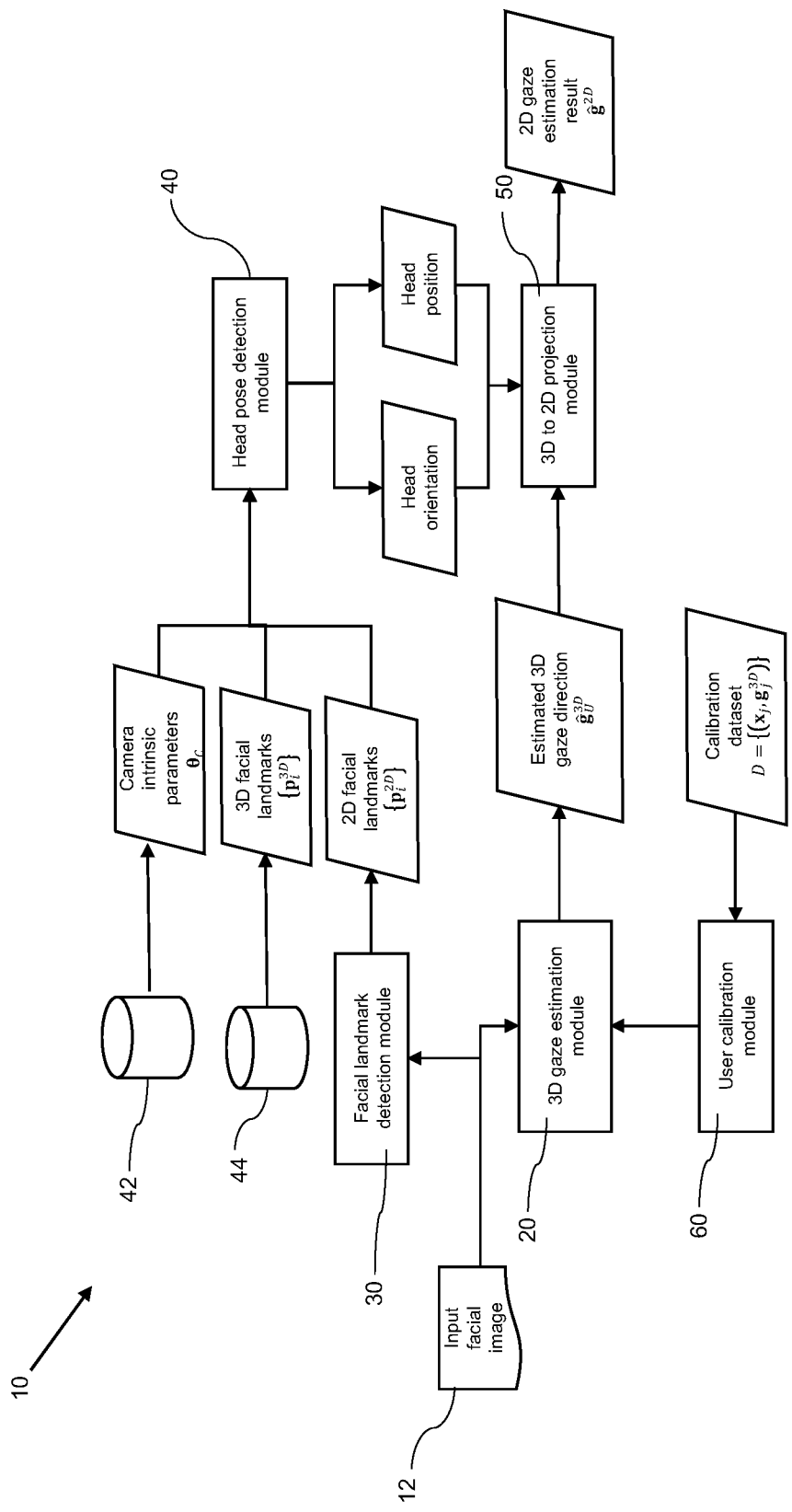
FIG. 1 is a schematic illustration of the data flow of a prior art 2D on-screen user gaze estimation system.

According to a general aspect, a system, a method and a non-transitory storage medium storing instruction for carrying out the method when executed by a processor are described hereafter, which provide a 2D on-screen gaze estimation result by processing images of a user acquired by a camera in real-time (or near real-time). The proposed system, and associated method, allow compatibility with any computing device including a camera and to autonomously perform user calibration relative to the user for improving estimation accuracy. The calibration is constraint-free regarding the position and/or pose of the head of the user in the acquired images (i.e. does not assume that head of the user has a specific position and/or pose in the acquired images). In an embodiment, the camera used for acquiring (otherwise referred to as capturing) the images of a user that are used by the system, method, and computer-readable media of the present application for performing 2D gaze estimation is a single red-green-blue (RGB) camera.

In the following description, the same numerical references refer to similar elements. The embodiments mentioned in the present description are embodiments only, given solely for exemplification purposes.

Moreover, although the embodiments of the method and system consist of certain components, steps and/or configurations as explained and illustrated herein, not all of these components, steps and/or configurations are essential and should not be taken in their restrictive sense. It is to be understood, as also apparent to a person skilled in the art, that other suitable components and cooperation thereinbetween, as well as other suitable configurations, may be used for the system described herein. It will also be appreciated that the steps of the corresponding method could be performed in the described order, or in any suitable order. The skilled reader will readily recognize that the steps of the method can be performed by programmed computers. The embodiments are also intended to cover non-transitory processor-readable storage medium having instructions stored thereon to perform said steps of the above-described methods when executed by a processor.

In the present description, the term system refers to a computer-implemented system which comprises different hardware components (such as databases or data storage, processing devices, buses, etc.) and software components. Software components comprise software functions, including program code or instructions that, when executed, will provide the intended functionality, including for example running queries, requesting data, calling other functions, performing computations, comparing values, outputting parameters, etc. The software components interact with different databases or data sources to transform and output data. The different software components are further configured to communicate with other software components and peripherals of the system.

The term processing device encompasses computers, servers and/or specialized electronic devices configured and adapted to receive, store, process and/or transmit data. Processing devices include processors, such as microcontrollers and/or microprocessors, CPUs and GPUs, as examples only. The processors are used in combination with memory, also referred to as "storage medium". The memory can store data structures, instructions, algorithms, and rules to be processed. The term memory encompasses volatile or non-volatile/persistent memory, such as registers, cache, RAM, flash memory, ROM, as examples only. The type of memory is, of course, chosen according to the desired use, whether it should retain instructions or data, or temporarily store, retain or update data. Processing devices can interact with other peripheral devices, such as displays, graphic cards, keyboards, cameras, microphones, etc.

One skilled in the art will therefore understand that each such computing device typically includes a processor (or multiple processors) that executes program instructions stored in the memory or other non-transitory computer-readable storage medium or device (e.g., solid state storage devices, disk drives, etc.). The various functions, modules, services, units or the like disclosed hereinbelow can be embodied in such program instructions, and/or can be implemented in application-specific circuitry (e.g., ASICs or FPGAs) of the computing devices. Where a computer system includes multiple computing devices, these devices can, but need not, be co-located. In some embodiments, a computer system can be a cloud-based computing system whose processing resources are shared by multiple distinct entities.

In view of the above, one skilled in the art will understand that the processor (or multiple processors) of the processing device (or multiple processing devices) can be configured to execute the different modules of the present system by software; hardware; firmware; some combination of software, hardware, and/or firmware; and/or other mechanisms for configuring processing capabilities on processors. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated by those skilled in the art that any block diagrams herein represent conceptual views of illustrative circuitry embodying the principles disclosed herein. Similarly, it will be appreciated that any flow charts and transmission diagrams, and the like, represent various processes which may be substantially represented in computer-readable medium and so executed by a computer or processor, whether or not such computer or processor is explicitly shown.

The term head coordinate system (HCS) and camera coordinate system (CCS) are used herein to refer to 3D cartesian coordinate systems having origins respectively positioned at a point positioned between the eyes of the of user and in a middle of the lens of the camera capturing the images of the user.

The term intrinsic camera parameters is used herein to define the set of parameters for a camera, such as, for example a RGB camera, which allow linking of the pixel coordinates of an image point with the corresponding coordinates in the camera reference frame. The intrinsic parameters are parameters intrinsic to the camera itself and include, for instance and without being limitative the focal length of the camera, the lens distortion, etc.

Referring to FIG. 1, a schematic illustration of the components of and the data flow in a prior art 2D gaze estimation system 10 is shown. The prior art system 10 shown in FIG. 1 includes a 3D gaze estimation module 20, a facial landmark detection module 30, a head pose detection module 40 and a 3D to 2D projection module 50. An extrinsic user calibration module 60 provides user calibration acquired from extrinsic calibration and the head pose detection module 40 uses a generic face model in order to perform the required head pose estimations.

The 3D gaze estimation module 20 and facial landmark detection module 30 receive an input facial image 12 of a user captured by a camera and use computer vision algorithms to respectively generate an estimated 3D gaze direction $\hat{g}^{3D}$ corresponding to a line of sight of the user and 2D facial landmarks $\{p_i^{2D}\}$ defining a set of 2D coordinates of the facial landmarks for the user in the image. The head pose estimation module 40 receives the 2D facial landmarks $\{p_i^{2D}\}$, as well as 3D facial landmarks $\{p_i^{3D}\}$ for a generic face model and camera intrinsic parameters $\theta_C$ relative to the camera used for capturing the input facial image 12. As can be seen, the 3D facial landmarks $\{p_i^{3D}\}$ and the camera intrinsic parameters $\theta_C$ can be received from corresponding data storages 42, 44 in which the 3D facial landmarks $\{p_i^{3D}\}$ and the camera intrinsic parameters $\theta_C$ are data is stored. The head pose estimation module 40 uses corresponding 2D and 3D landmark pairs $\{(p_i^{2D}, p_i^{3D})\}$ as well as the camera intrinsic parameters $\theta_C$, and a head pose estimation algorithm to generate a rotation matrix R and a position vector t of the user's head. The 3D to 2D projection module 50 receives the rotation matrix R and position vector t and the estimated 3D gaze $\hat{g}^{3D}$ and uses a conversion algorithm to map the estimated 3D gaze $\hat{g}^{3D}$, into 2D on-screen gaze estimation result $\hat{g}^{2D}$.

In the prior art system 10 of FIG. 1, the extrinsic calibration module 60 requires an extrinsic calibration procedure to be performed by the user, for example which involves the user gazing at specific points of a display screen, while 3D gaze data is acquired to generate a calibration dataset $D=\{(x_j, g_j^{3D})\}$ (where $(x_j, g_j^{3D})$ represent samples of 3D gaze data and each sample of 3D gaze data includes a calibration image $x_j$ and a corresponding estimated 3D gaze direction $g_j^{3D}$) used for correcting the estimated 3D gaze direction $\hat{g}^{3D}$ being generated and fed to the 3D to 2D projection module 50. As mentioned above, the head pose detection module 40 uses a generic face model to generate the required head pose estimations. The rotation matrix R and position vector t of the user's head are consequently generated based on generic user data (a generic face model), rather than user-specific data, thereby negatively impacting the accuracy of the 2D on-screen gaze estimation result $\hat{g}^{2D}$.

Figure 2:
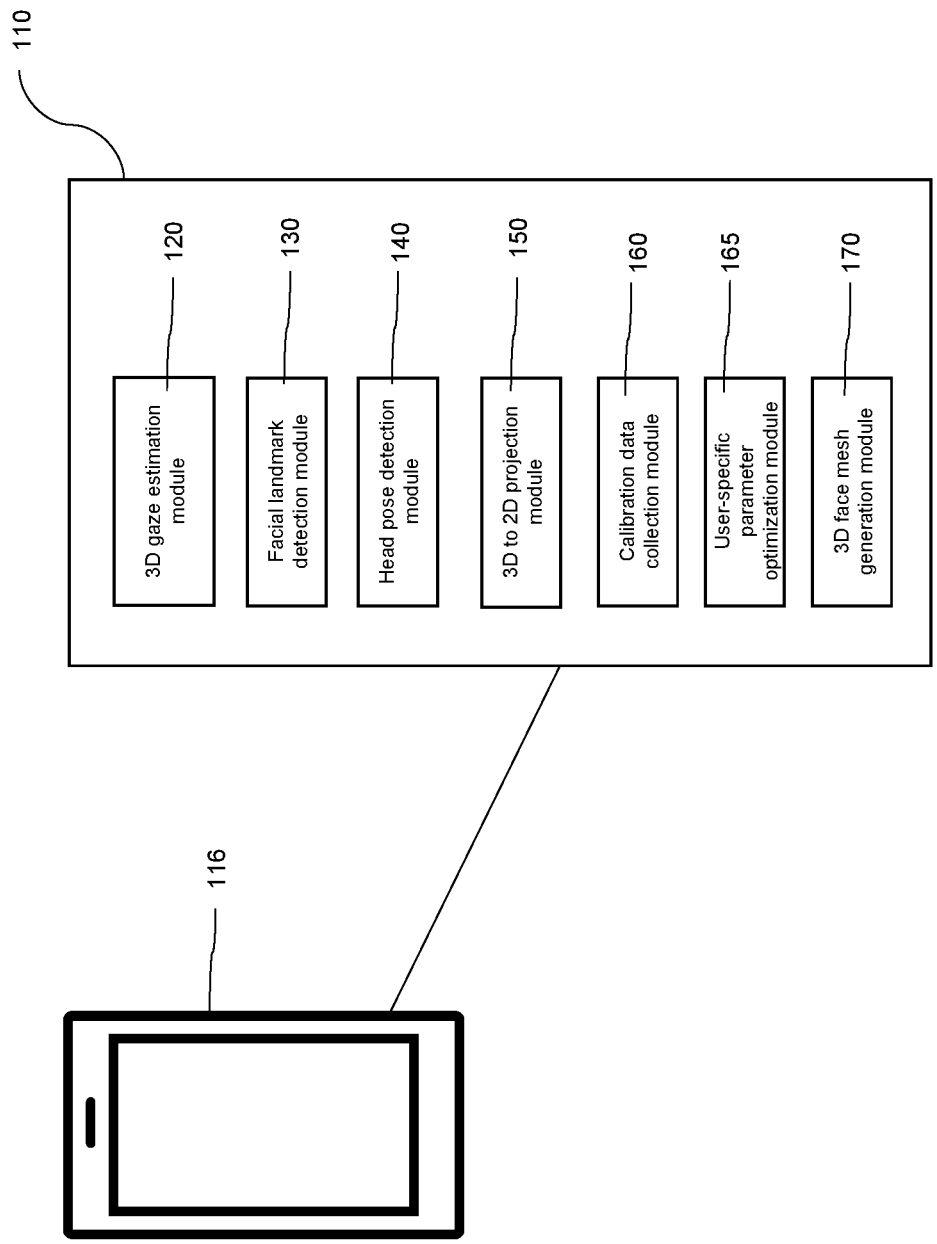
FIG. 2 is a schematic illustration of the 2D on-screen user gaze estimation system in accordance with an embodiment of the present application.
Figure 3:
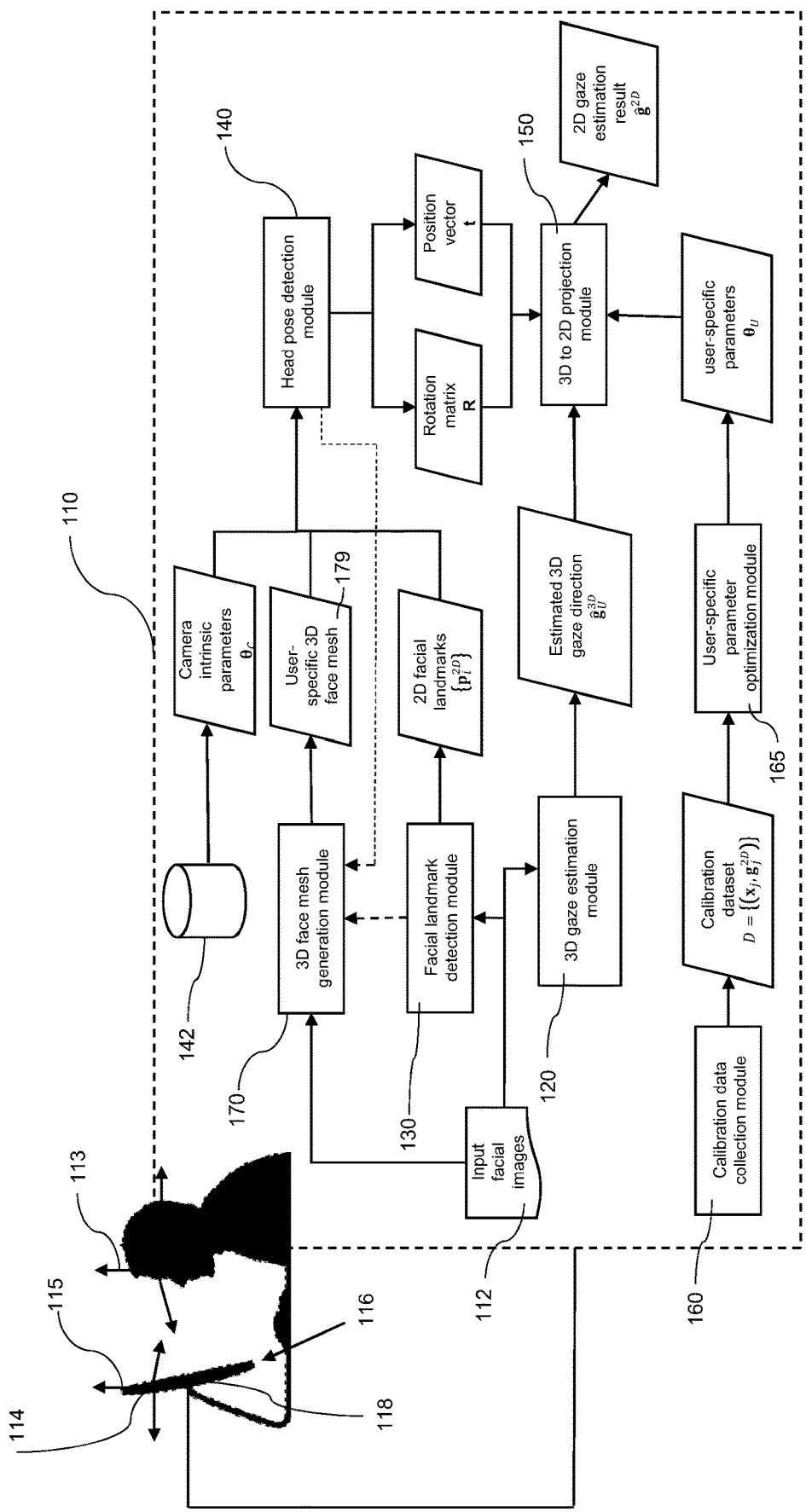
FIG. 3 is a schematic illustration of the data flow of the gaze estimation system of FIG. 2, in accordance with an embodiment of the present application.

In order to alleviate these drawbacks, FIGS. 2 and 3 show a schematic illustration of the components of and the data flow in an embodiment of a 2D gaze estimation system 110 of the present application. The 2D gaze estimation system 110 hereinafter referred to as system 110) is configured for performing 2D on-screen gaze estimation, for a specific user, from input facial images 112 of the user, where the user head is positioned in a head coordinate system (HCS) 113. For the purposes of the present application, the input facial images 112 are images acquired or captured by a camera as a user interacts with a display screen of a processing device that includes the face of the user. Each input facial image in the input facial images 112 may be the entire image captured or acquired by the camera which includes the entire user, including the face of the user. In some embodiments, each input facial image in the input facial images 112 may be a cropped version of the image acquired or captured by the camera that includes only the face of the user. In an embodiment, the system 110 operates on (i.e. processes) input facial images 112 acquired or captured using a single RGB camera 114 associated to a processing device 116 having a display screen 118 and positioned in a camera coordinate system (CCS) 115 and the system comprises:
1) a 3D face mesh generation module 170 for autonomously generating a user-specific 3D face mesh specific to the user, from a set of reference facial images of the user;
2) a calibration data collection module 160 for autonomously recording calibration samples where each calibration sample includes a calibration facial image and a corresponding interaction point on the display screen for an occurrence of a user interaction;
3) a user-specific parameter optimization module 165 for generating and a set of user-specific parameters $\theta_U$ provided to the 3D to 2D projection module 150; and
4) a 3D to 2D projection module 150 for receiving and using the set of user-specific parameters $\theta_U$ to improve the accuracy of the conversion performed thereby.

One skilled in the art will understand that in alternative embodiments a camera different than a RGB camera, such as, for example and without being limitative a near-infrared (NIR) camera, a time-of-flight (ToF) camera or the like could also be used acquire or capture images of the user of the system 100.

As can be seen in FIGS. 2 and 3, the system 110 also includes a 3D gaze estimation module 120, a facial landmark detection module 130, a head pose detection module 140, and the 3D to 2D projection module 150. As will be described in more details below, the 3D to 2D projection module 150 of the system 110 adapted to use calibration data provided by the user-specific parameter optimization module 165, and used by the 3D to 2D projection module 150 in order to map the estimated 3D gaze direction $\hat{g}^{3D}$ into 2D on-screen gaze estimation result $\hat{g}^{2D}$.

The 3D gaze estimation module 120 is configured to receive the input facial images 112 of a user and to use a computer vision algorithm to process the input facial images 112 to generate an estimated 3D gaze direction $\hat{g}^{3D}$ corresponding to the line of sight of the user in the input facial images 112. One skilled in the art will readily understand that several computer vision algorithms could be used to process the input facial images 112 to generate the estimated 3D gaze direction $\hat{g}^{3D}$, such as, for example and without being limitative, the OpenFace algorithm or the GazeNet algorithm. The estimated 3D gaze direction $\hat{g}^{3D}$ can be formulated in either a 3D unit-norm vector $(x_g, y_g, z_g)$ or a combination of pitch and yaw angles $(\phi_g, \theta_g)$, the 3D unit-norm vector being easily transferable to the combination of pitch and yaw angle and vice versa, using corresponding transformation matrices.

The facial landmark detection module 130 is configured to receive the input facial images 112 of a user and to use a computer vision algorithm to process the input facial images 112 to generate therefrom facial landmarks defining a set of coordinates of the facial landmarks for the user detected in the input facial images 112, in the HCS 113. One skilled in the art will again readily understand that several computer vision algorithms could be used to process the input facial images 112 to generate the facial landmarks $\{p_i^{2D}\}$ such as, for example and without being limitative, the OpenFace algorithm or the Dlib algorithm generating 2D facial landmarks and the Face-alignment algorithm or MediaPipe algorithm generating 3D facial landmarks.

In an embodiment, the facial landmark detection module 130 generates 2D facial landmarks $\{p_i^{2D}\}$ defining a set of 2D coordinates of the facial landmarks for the user in the input facial image s112, in the HCS 113. In some embodiments, the facial landmark detection module 130 uses a computer vision algorithm to process the input facial images 112 to generate 3D facial landmarks $\{p_i^{3D}\}$ defining a set of 3D coordinates of the facial landmarks for the user in the input facial images 112 (e.g. Face-alignment algorithm or MediaPipe algorithm), and the facial landmark detection module discards the depth dimension Z from the 3D facial landmarks $\{p_i^{3D}\}$, in order to generate the 2D facial landmarks $\{p_i^{2D}\}$.

As will be better understood in view of the description below, in an embodiment, the facial landmark detection module 130 generates the 2D facial landmarks $\{p_i^{2D}\}$ to be used by the system 110. In some embodiments, the facial landmark detection module 130 generates 3D facial landmarks $\{p_i^{3D}\}$ defining a set of 3D coordinates of the facial landmarks for the user in the input facial images 112 to be used by the 3D face mesh generation module 170. When used in combination with the 3D face mesh generation module 170, the computer vision algorithm the facial landmark detection module 130 can be selected to directly generate 3D facial landmarks $\{p_i^{3D}\}$ (e.g. 3DDFA algorithm or MediaPipe facial landmark detection algorithm can be selected). Alternatively, the computer vision algorithm of the facial landmark detection module 130 can be selected to generate 2D facial landmarks $\{p_i^{2D}\}$ defining a set of 2D coordinates of the facial landmarks for the user in the input facial images 112 (e.g. OpenFace algorithm or Dlib 2D facial landmark detection algorithm) and the depth dimension Z for each one of the 2D facial landmarks $\{p_i^{2D}\}$ can be added from the Z values of a generic face mesh for the corresponding 2D coordinates.

The head pose estimation module 140 receives the 2D facial landmarks $\{p_i^{2D}\}$, as well as 3D facial landmarks $\{p_i^{3D}\}$ for a face model (or the user specified face mesh 179) in the HCS 113 and camera intrinsic parameters $\theta_C$ relative to the camera 114 used for capturing the input facial images 112. The camera intrinsic parameters $\theta_C$ can be received from a corresponding data storage 142 in which the camera intrinsic parameters $\theta_C$ are stored. It will be understood that, in alternative embodiments (not shown), the camera intrinsic parameters $\theta_C$ could be stored in multiple distinct data storages. The head pose estimation module 140 is configured to generate 2D and 3D landmark pairs $\{(p_i^{2D}, p_i^{3D})\}$ from the 2D facial landmarks $\{p_i^{2D}\}$ and 3D facial landmarks $\{p_i^{3D}\}$ and to use the 2D and 3D landmark pairs $\{(p_i^{2D}, p_i^{3D})\}$ and the camera intrinsic parameters $\theta_C$ as input parameters to execute a head pose estimation algorithm and generate therefrom a position vector t and a rotation matrix R of the user's head in the CCS 115. One skilled in the art will again readily understand that the head pose estimation module 140 can use one of several head pose estimation algorithms, such as, for example, a Perspective-n-Point (PnP) algorithm or a variant thereof (e.g. Efficient Perspective-n-Point (EPnP) algorithm, Uncalibrated Perspective-n-Point (UPnP), etc.) to generate the position vector t and the rotation matrix R of the user's head in the CCS 115.

As will be better understood in view of the description below, the head pose estimation module 140 of the system 110 generates the position vector t and the rotation matrix R of the user's head in the CCS 115, based on a user-specific face mesh defining 3D facial landmarks $\{p_i^{3D}\}$ generated from the 3D face mesh generation module 170 and used for generating the 2D and 3D landmark pairs $\{(p_i^{2D}, p_i^{3D})\}$. As described in more detail below, the head pose estimation module 140 can also be used by the 3D face mesh generation module 170 to determine the orientation of the head of the user, such that the 3D face mesh generation module 170 can screen the input facial images 112 in which the face of the user is in an orientation where the face is directly facing the camera 114 (or within a satisfactory rotational range defined as representative of the user sufficiently facing the camera 114).

Figure 4:
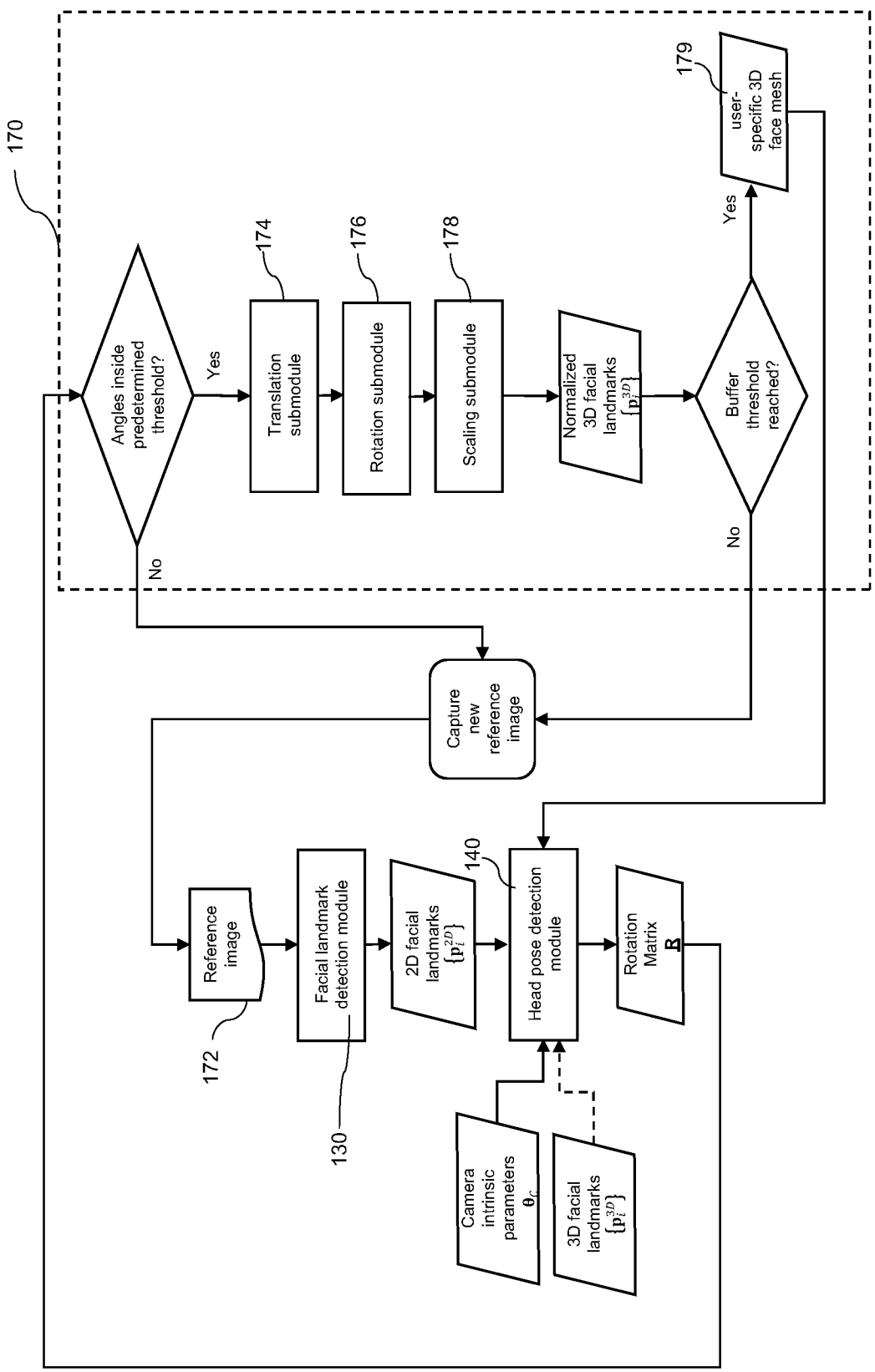
FIG. 4 is a schematic illustration of the data flow for through a 3D face mesh generation module, a facial landmark detection module, a head pose detection module of the gaze estimation system of FIG. 2, in accordance with an embodiment of the present application.

Referring to FIG. 4, the 3D face mesh generation module 170 is a dedicated module of the system 110 which is configured to generate 3D facial landmarks $\{p_i^{3D}\}$ for a face model in the HCS 113, defining a user-specific 3D face mesh 179, from a set of reference images 172 of the user. In the embodiment shown, the reference images in the set of reference images 172 are input facial images 112 for which the system 110 performs 2D gaze estimation, the 3D face mesh generation module 170 thereby incrementally generating and refining the user-specific 3D face mesh 179 generated by the 3D face mesh generation module 170 as the system 110 performs 2D gaze estimation. In an alternative embodiment (not shown), the reference facial images in the set of reference images 172 can include a combination of input facial images 112 for which the system 110 performs 2D gaze estimation and additional user images or only user facial images used by the 3D face mesh generation module 170 and not used by the system 110 to perform 2D gaze estimation.

In the embodiment shown, the 3D face mesh generation module 170 is configured to perform an initial screening process for determining if a reference facial image in the set of reference images 172 shows the face of the user within a predetermined head orientation range indicative that the user is directly facing the camera 114. The 3D face mesh generation module 170 generates the 3D facial landmarks $\{p_i^{3D}\}$ for a face model in the HCS 113, defining a user-specific 3D face mesh 179, from the determined reference images 172, using the facial landmark detection module 130 generates 2D facial landmarks $\{p_i^{2D}\}$ from the determined reference facial images 172. The head pose estimation module 140 receives the camera intrinsic parameters $\theta_C$ of the camera used for capturing the determined reference images 172, the 3D facial landmarks $\{p_i^{3D}\}$ for a face model in the HCS from the 3D face mesh generation module 170, and the 2D facial landmarks $\{p_i^{2D}\}$ from the facial landmark detection module 130 and performs the head pose estimation algorithm and generate the rotation matrix R of the user's head in the CCS.

In an embodiment, the rotation matrix R of the user's head can be generated in Euler angle form $\{\phi, \theta, \psi\}$, defining respectively a roll, yaw and pitch angle. If the roll, yaw and pitch angles $\{\phi, \theta, \psi\}$ are all equal to 0 or inside a predetermined threshold corresponding to the user sufficiently facing the camera, the 3D face mesh generation module 170 is configured to perform a series of linear transformations upon the coordinates of the set of 3D facial landmarks $\{p_i^{3D}\}$ detected in the set reference images 172. Conversely, if one of the roll, yaw and pitch angles $\{\phi, \theta, \psi\}$ is outside of the predetermined threshold, the face mesh generation module 170 is configured to discard the corresponding image and restart the screening process for a new image. In an embodiment, the predetermined threshold ranges between 4° and −4° for the roll angle, between 4° and −4° for the yaw angle and between 10° and −10° for the pitch angle.

In an embodiment, the 3D facial landmarks $\{p_i^{3D}\}$ for a face model in the HCS 113 can be initially acquired from a generic face model when no user-specific 3D face mesh 179 has been generated. When a user-specific 3D face mesh 179 has been generated, the user-specific 3D face mesh 179 can be used for the face model in the HCS 113 being provided to the head pose estimation module 140 and from which the 3D facial landmarks $\{p_i^{3D}\}$ are acquired.

When the corresponding image is determined to be acceptable following the screening process, the 3D face mesh generation module 170 is configured to perform the above-mentioned series of linear transformation operations upon the coordinates of the set of 3D facial landmarks $\{p_i^{3D}\}$ of the corresponding image to perform normalization for the current corresponding image. In an embodiment, the series of linear transformations operations are performed using a translation submodule 174, a rotation submodule 176 and a scaling sub-module 178.

The translation submodule 174 is configured to determine the midpoint of the two eyes of the user from the set of 3D facial landmarks $\{p_i^{3D}\}$ and to translate the set of 3D facial landmarks $\{p_i^{3D}\}$ to match the origin (0,0,0) of the HCS with the midpoint of the two eyes. This allows the alignment of the eyes of the user with the optical axis of the camera for the set of 3D facial landmarks $\{p_i^{3D}\}$.

The rotation submodule 176, is configured to receive the rotation matrix R of the user's head in the camera coordinate system (CCS) and to rotate the set of 3D facial landmarks $\{p_i^{3D}\}$ for the roll, yaw and pitch angles of the rotation matrix R of the user's head in the Euler form $\{\phi, \theta, \psi\}$ to be equal to 0. This allows the rotated face defined by the set of 3D facial landmarks $\{p_i^{3D}\}$ to be directly facing the camera.

The scaling sub-module 178 is configured to convert the original pixel unit coordinates of the 3D facial landmarks $\{p_i^{3D}\}$ of the corresponding image into metric units and to scale the head defined by the 3D facial landmarks $\{p_i^{3D}\}$ of the corresponding image to match an average human head (i.e. to scale the 3D facial landmarks $\{p_i^{3D}\}$ according to parameters of an average head). Therefore, the scaling sub-module 178 is configured to apply a scaling factor corresponding to the value of a facial feature determined by the converted 3D facial landmarks $\{p_i^{3D}\}$ relative to the value of the facial feature of the average human head. In an embodiment, the scaling factor is determined at least by one of the value of the inter-pupillary distance (IPD) determined by the converted 3D facial landmarks $\{p_i^{3D}\}$ relative to the average inter-pupillary distance (IPD) of the human head (63.5 mm) and the value of the iris diameter determined by the converted 3D facial landmarks $\{p_i^{3D}\}$ relative to the average iris diameter of the human head (11.7 mm).

One skilled in the art will understand that the series of linear transformation operations can be provided by the combination of each one of the translation submodule 174, rotation submodule 176 and scaling sub-module 178 when each one of the transformations are required to normalize the 3D facial landmarks $\{p_i^{3D}\}$. However, in cases where the 3D facial landmarks $\{p_i^{3D}\}$ are properly positioned, rotated and/or proportioned, only one or two of the translation, rotation and/or scaling can be performed, the unnecessary transformation being omitted, as it is unnecessary for the normalization of the 3D facial landmarks $\{p_i^{3D}\}$.

Following the series of linear transformation operations provided by the combination of each one of the translation submodule 174, rotation submodule 176 and scaling sub-module 178, normalized 3D facial landmarks $\{p_i^{3D}\}$ are generated for the corresponding image. In an embodiment, the normalized 3D facial landmarks $\{p_i^{3D}\}$ are stored in a buffer.

In an embodiment, the 3D face mesh generation module 170 is configured to repeatedly store the normalized 3D facial landmarks in the buffer until a buffer threshold of normalized facial landmarks is reached and to generate the user-specific 3D face mesh 179 based on the normalized facial landmarks stored in the buffer (i.e. based on the normalized facial landmarks obtained from at least the subset of reference facial images of the set of reference facial images for which normalized facial landmarks have been generated and stored in the buffer). In an embodiment, the buffer threshold of normalized facial landmarks corresponds to a buffer capacity of the buffer. For example and without being limitative, in an embodiment, the buffer threshold of normalized facial landmarks includes 10 normalized facial landmarks.

In an embodiment, the 3D face mesh generation module 170 is configured to determine the mean values of the normalized facial landmarks stored in the buffer and the user-specific 3D face mesh 179 is defined as the mean of the buffered sets of normalized facial landmarks.

It will be understood that the user-specific 3D face mesh 179 is device-independent. Hence, the user-specific 3D face mesh 179 can be stored in a data storage to be fetched by another processing device and/or communicated to other processing devices by any data communication channels and/or means, to be used directly without requiring a corresponding 3D face mesh generation module 170 on the other processing device (i.e. without having to perform the face mesh generation procedure of the 3D face mesh generation module 170 on the other device). In an alternative embodiment, the user-specific 3D face mesh 179 can also be stored in a memory of the processing device 116 of the present system 110 and communicated directly to another processing devices in data communication with the processing device of the present system, without being stored in a corresponding intermediate data storage.

Figure 5:
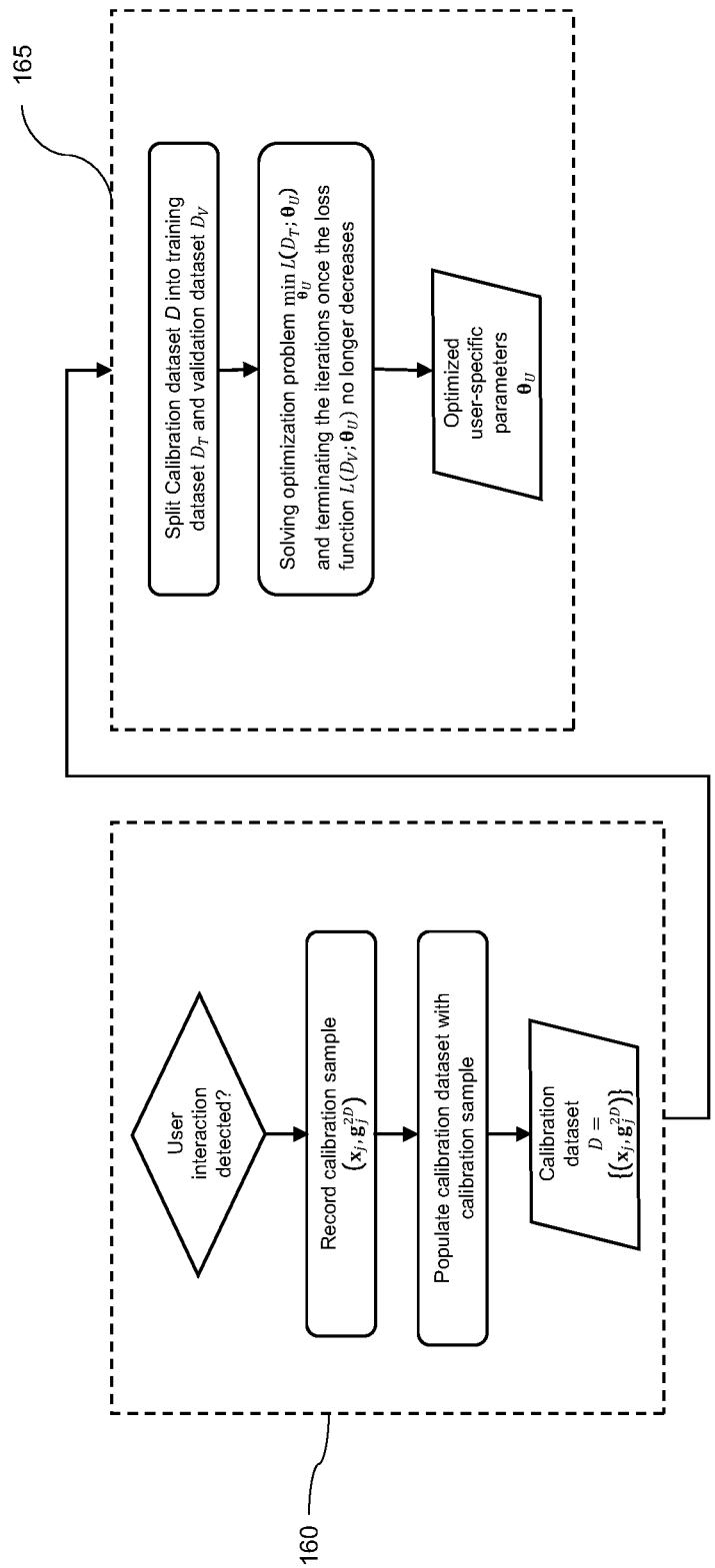
FIG. 5 is a schematic illustration of the data flow for the calibration data collection module and the user-specific parameter optimization module of the gaze estimation system of FIG. 2, in accordance with an embodiment of the present application.

Referring to FIGS. 2, 3 and 5, the calibration data collection module 160 and user-specific parameter optimization module 165 are modules of the system 110 configured to generate the set of user-specific parameters $\theta_U$ which will subsequently be used by the 3D to 2D projection module 150 to improve the accuracy of the 2D coordinates conversion performed thereby, as will be described in more details below.

The calibration data collection module 160 is configured to record calibration samples and populate a calibration dataset $D=\{(x_j, g_j^{2D})\}$, while the user-specific parameter optimization module 165 is configured to generate and optimize the set of user-specific parameters $\theta_U$ based on the collected calibration dataset D.

The calibration data collection module 160 is configured to run autonomously and seamlessly to the user, to populate the calibration dataset $D=\{(x_1, g_j^{D})\}$ through repeated captures of calibration samples. The calibration samples each correspond to an occurrence of a user interaction, such as, for example, a click of a mouse, a touch of a touchscreen, etc., and each include a calibration facial image x captured upon the occurrence of the user interaction and the corresponding interaction point location $g^{2D}$ on the display screen 118 of the processing device 116. In other words, the calibration data collection module 160 operates without requiring explicit user inputs and on the assumption that the point of regard (PoR) of the user matches or is close to the interaction point location $g^{2D}$ at the time of the user interaction. The calibration data collection module 160 therefore monitors and/or detects user interactions on the processing device 116 and repeatedly records the calibration sample including the calibration facial image x and the interaction point location $g^{2D}$ on the screen 118, upon detection of an occurrence of a user interaction. The calibration data collection module 160 subsequently populates the calibration dataset $D=\{(x_j, g_j^{2D}))\}$ with the recorded calibration samples.

The user-specific parameter optimization module 165 is configured to process the data of the calibration samples of the calibration dataset $D=\{(x_j, g_j^{2D})\}$ and determine therefrom an optimized set of user-specific parameters $\theta_U$. As will be described in more details below, in an embodiment the user-specific parameter optimization module 165 is configured to determine the optimized set of user-specific parameters $\theta_U$ by iteratively minimizing a total difference between the interaction points of a plurality of the calibration samples of the calibration dataset used as ground truth values and corresponding 2D gaze estimation results $g^{2D}$ obtained by applying the 3D gaze estimation module 120 and the 3D to 2D projection module 150 to corresponding calibration facial images $x_j$ of the plurality of calibration samples $(x_j, g_j^{2D})$.

In an embodiment, the set of user-specific parameters is defined as $\theta_U=\{k_\phi, b_\phi, k_\theta, b_\theta, s, y_O, z_O\}$, where s is a scaling factor with respect to the user-specific 3D face mesh for calibrating a head size of the user, $k_\phi$, $k_\phi$, $k_\theta$, $b_\theta$ specify a linear transform to the estimated 3D gaze direction in pitch and yaw angle form defined as $\hat{g}^{3D}=(\phi_g, \theta_g)$ resulting in a user-specific estimated 3D gaze direction defined as $\hat{g}_U^{3D}=(k_\phi\phi_g+b_\phi, k_\theta\theta_g+b_\theta)$, and $(0, y_O, z_O)$ specify the coordinates of an origin of the HCS in which the head of the used is positioned in a corresponding one of the calibration facial images.

In an embodiment, the user-specific parameter optimization module 165 is configured to divide the calibration dataset D between a training dataset $D_T$ and a validation dataset $D_V$, whenever a new sample is added to the calibration dataset D and the number of calibration samples in the calibration dataset exceeds two. In an embodiment, the calibration dataset D is divided in half randomly, whenever a new sample is added to the calibration dataset D and the number of calibration samples in the calibration dataset exceeds two, with each half being used to generate a corresponding of the training dataset $D_T$ and the validation dataset $D_V$.

Using the training dataset $D_T$ and the validation dataset $D_V$, in an embodiment the user-specific parameter optimization module 165 is configured to iteratively minimize the total difference between the interaction points of a plurality of the calibration samples of the calibration dataset used as ground truth values and corresponding 2D gaze estimation results $\hat{g}^{2D}$ by iteratively minimizing the total difference between the interaction points of the calibration samples and corresponding 2D gaze estimation results $g^{2D}$ of the training dataset $D_T$ and terminating the iterations when the difference between the interaction points of the calibration samples and corresponding 2D gaze estimation results $g^{2D}$ of the validation dataset $D_V$ no longer decreases.

In an embodiment, the total difference between the interaction points of the plurality of the calibration samples and corresponding 2D gaze estimation results is defined by a loss function. In more details, in an embodiment, the loss function is defined as:

$$L(D_*; \theta_U) \triangleq \sum_{(x, g^{2D}) \in D_*} \|\hat{g}^{2D}(x; \theta_U) - g^{2D}\|_2^2$$

for the samples in the calibration dataset D including the training dataset $D_T$ and the validation dataset $D_V$ such that it can be defined as $D_*$, $* \in \{T, V\}$. In the loss function, $\hat{g}^{2D}(x; \theta_U)$ represents the 2D gaze estimation result with respect to the set of user-specific parameters $\theta_U$, generated by the as will be defined in more details below with reference to the 3D to 2D projection module 150 and $g^{2D}$ represents the corresponding interaction point location used as ground truth value.

Hence, the user-specific parameter optimization module 165 is configured to perform minimization of the loss function for the calibration dataset D, to determine the optimized set of user-specific parameters $\theta_U$. In an embodiment, the minimization of the loss function is performed by iteratively minimizing the loss function for the training dataset $D_T$ using an iterative Broyden-Fletcher-Goldfarb-Shanno (BFGS) algorithm, such as a limited-memory BFGS (L-BFGS) algorithm and terminating the iterations when the results of the loss function for the validation dataset $D_V$ no longer decreases in order to generate 2D gaze estimation results being as close to the corresponding ground truth values as possible.

In other words, the user-specific parameter optimization module 165 is configured to determine the set of user-specific parameters $\theta_U$ minimizing the loss function for the calibration dataset D, by solving the optimization problem $$\min_{\theta_U} L(D_T; \theta_U)$$

using, for example, the above-mentioned iterative L-BFGS algorithm and terminating the iterations once the loss function $L(D_V; \theta_U)$ no longer decreases, in order to avoid overfitting.

In an embodiment, the parameters of the set of user-specific parameters $\theta_U$ are initially set as: $s=k_*=1$ and $b_*=y_O=z_O=0$ when the user-specific parameter optimization module 165 is initialized.

In an embodiment, the user-specific parameter optimization module 165 is configured to update the set of user-specific parameters $\theta_U$, whenever the training dataset $D_T$ and the validation dataset $D_V$ are updated (i.e. whenever a new sample is added to the calibration dataset and the number of calibration samples in the calibration dataset exceeds two, thereby leading to generation of new training dataset $D_T$ and validation dataset $D_V$) by repeating the iterations from an end of a last iteration performed for optimizing the user-specific parameters, in order to minimize the number of iterations required to converge towards the optimized set of user-specific parameters $\theta_U$.

Referring back to FIGS. 2 and 3, the 3D to 2D projection module 150 is configured to convert the estimated 3D gaze direction $\hat{g}^{3D}$ generated by the 3D gaze estimation module 120 into a 2D gaze estimation result $\hat{g}^{2D}$ defining coordinates in a coordinate system of the display screen 119. The 3D to 2D projection module 150 is therefore configured to determine the coordinates of an intersection point between a line of sight originating from a starting point O in the CCS 115 and traveling along the estimated 3D gaze direction $\hat{g}^{3D}$ ($x_g, y_g, z_g$) and a surface of the display screen 118 in the CCS 115.

In an embodiment, the starting point O in the CCS 115 is assumed to be the origin of the HCS 113 by the 3D to 2D projection module 150, such that the coordinates thereof in the CCS 115 are defined by the position vector $t=(x_t, y_t, z_t)$ of the head of the user in the CCS 115 generated by the head pose detection module 140. In an embodiment, the 3D to 2D projection module 150 also operates under the assumption that the lens of the camera 114 that captured the input facial images 112 is substantially levelled with the screen surface in the coordinate system of the display screen 119, such that the screen surface corresponds to $z=0$ in the CCS 115. Therefore, the coordinates of the intersection point G are defined by $$G = \left(x_t - \frac{z_t}{z_g}x_g, y_t - \frac{z_t}{z_g}y_g, 0\right)$$

in the CCS 115, by the 3D to 2D projection module 150, before adjusting the coordinates of the intersection point according to the set of user-specific parameters $\theta_U$ defined by the user-specific parameter optimization module 165.

As previously mentioned, the 3D to 2D projection module 150 is further configured to apply calibration data and to adjust the coordinates of the intersection point according to the set of user-specific parameters $\theta_U$. When taking into account the set of user-specific parameters $\theta_U$, the adjusted coordinates of the intersection point G according to the set of user-specific parameters $\theta_U$ intersection point G can therefore be defined by:

$$G = \left(x_t^U - \frac{z_t^U}{z_g^U}x_g^U, y_t^U - \frac{z_t^U}{z_g^U}y_g^U, 0\right)$$

where:

$(x_t^U, y_t^U, z_t^U) = st + R(0, y_O, z_O)^T$ $x_g^U = \cos(k_\phi \phi_g + b_\phi)\sin(k_\theta \theta_g + b_\theta)$ $y_g^U = \sin(k_\phi \phi_g + b_\phi)$ $z_g^U = \cos(k_\phi \phi_g + b_\phi)\cos(k_\theta \theta_g + b_\theta)$.

in which t corresponds to the position vector $t=(x_t, y_t, z_t)$ of the head of the user in the CCS 115 generated by the head pose detection module 140, R corresponds to the rotation matrix of the head of the user in the CCS 115 also generated by the head pose detection module 140 and T corresponds to a matrix transpose.

Figure 6:
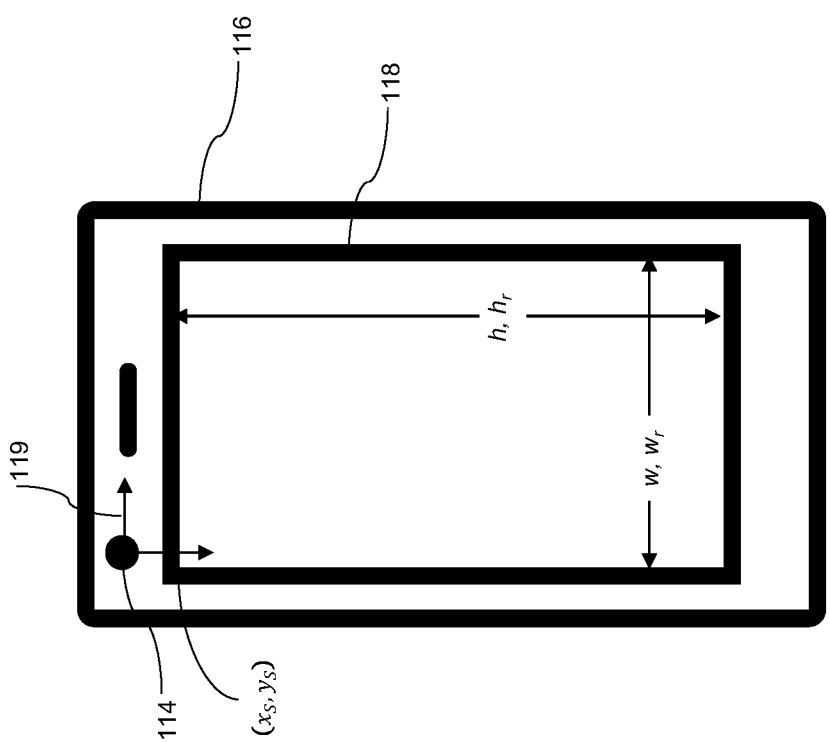
FIG. 6 is a front view of a processing device that includes the 2D on screen user gaze estimation system of FIG. 1 and has a 2D coordinate system superimposed on a display screen of the processing device.

Referring to FIG. 6, to determine the 2D gaze estimation result $\hat{g}^{2D}$, the 3D to 2D projection module 150 is further configured to convert the coordinates of the intersection point in the CCS as defined above, into the 2D gaze estimation result $\hat{g}^{2D}$ using parameters of the display screen 118. The parameters include the size of the display screen being defined as w×h, the resolution of the display screen being defined as $w_r \times h_r$, and the coordinate of a corner of the screen. For example, in the embodiment shown, the top-left corner of the display screen 118 in the coordinate system of the display screen 119 is defined as $(x_s, y_s)$ when the camera is positioned at the origin of the coordinate system of the display screen 119. The 2D gaze estimation result $\hat{g}^{2D}$ is therefore defined as:

$$\hat{g}^{2D} = \left( (x_G - x_S) \times \frac{w_r}{w}, (y_G - y_S) \times \frac{h_r}{h} \right)$$

In an embodiment, the 3D to 2D projection module 150 is further configured to output the 2D gaze estimation result $\hat{g}^{2D}$.

In the embodiment described above, the system 110 includes both the 3D face mesh generation module 170 and the autonomous calibration data collection module 160 and user-specific parameter optimization module 165 collaborating to provide autonomous user-specific correction for improved accuracy of the 2D gaze estimation result $\hat{g}^{2D}$. In an alternative embodiment, the system 110 could however be free of 3D face mesh generation module 170 and simply use data from a generic face mesh to generate the required 3D facial landmarks $\{p_i^{3D}\}$, with the above described autonomous calibration data collection module 160 and user-specific parameter optimization module 165, to improve over prior art systems.

Conversely, in another alternative embodiment, the system 110 could rather be free of calibration data collection module 160 and user-specific parameter optimization module 165 and provide calibration, for example through an extrinsic calibration procedure, with the above described 3D face mesh generation module 170 being provided and thereby improve over prior art systems.

Figure 7:
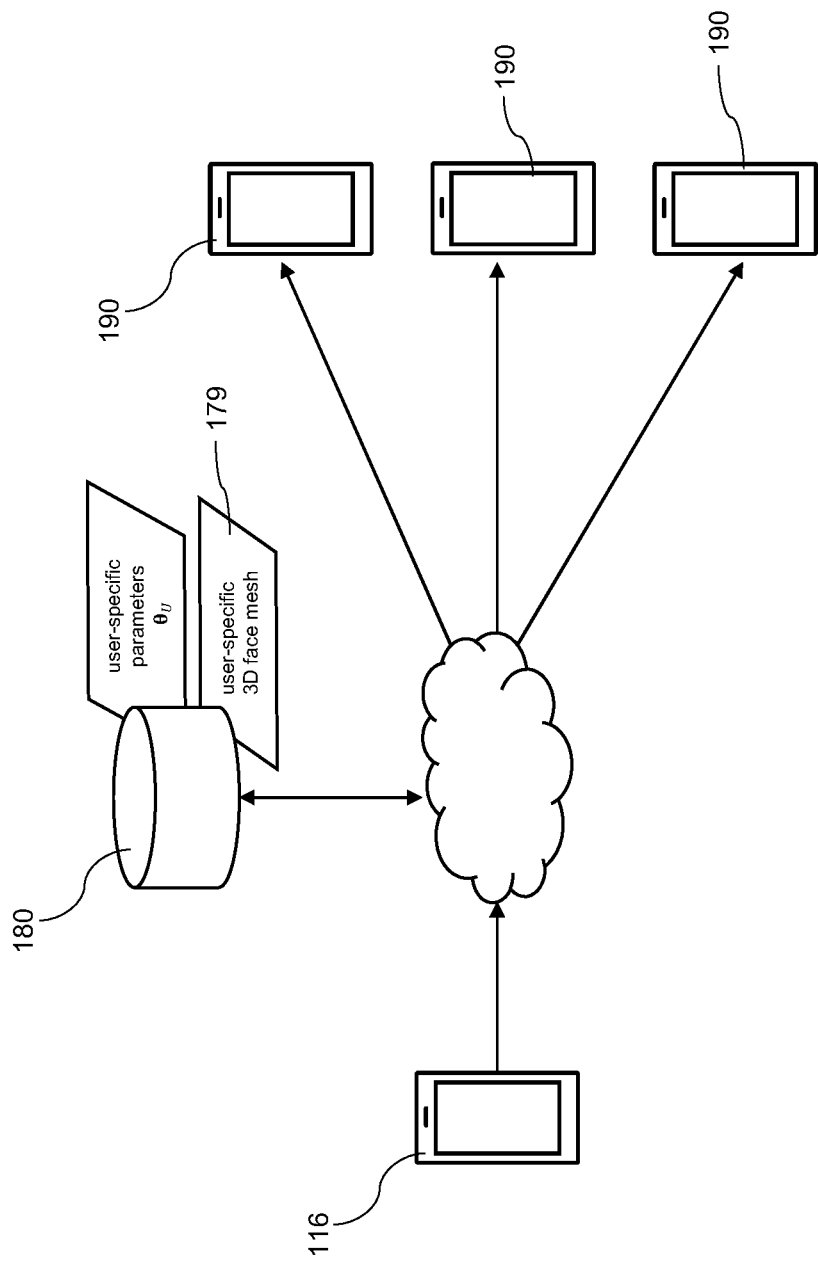
FIG. 7 is a schematic representation of a communication system that includes the processing device of FIG. 5 and other communication devices in communication with each other via a communication network.

Moreover, referring to FIG. 7, it will be understood that the system 110 implemented on one processing device can help accelerate the automatic calibration of a corresponding system 110 implemented on another target processing device 190 by providing the user-specific 3D face mesh 179 and/or at least one of the user-specific parameters $\theta_U$ to the other target processing device 190. Hence, as mentioned above, the user-specific 3D face mesh 179 can be transmitted to the target processing device 190 through storage of the 3D face mesh data in a data storage 180 to be received or acquired by the target processing device 190 and/or be transmitted directly or indirectly to the target processing device 190 by any data communication channels and/or means. Similarly, the at least one of the user-specific parameters $\theta_U$ can also be stored in the data storage 180 to be received or acquired by the target processing device 190 and/or be transmitted directly or indirectly to the target processing 190 by any data communication channels and/or means, to be used without requiring determination of optimized user-specific parameters on the target processing device 190 (i.e. without requiring a user-specific parameter optimization module 165 to perform the user-specific parameter $\theta_U$ generation and optimization procedure on the target processing device) or so that the optimization of the user-specific parameters $\theta_U$ by a user-specific parameter optimization module 165 on the target processing device 190 corresponding takes less iterations to converge on the target processing device 190. This can be particularly relevant for target processing devices having lower processing power.

In other alternative embodiments, the system 110 can be implemented in a cloud computing system which is in communication with the processing device 116. The system 110 may be provided as a service to the processing device 116 by the cloud computing system.

Figure 8:
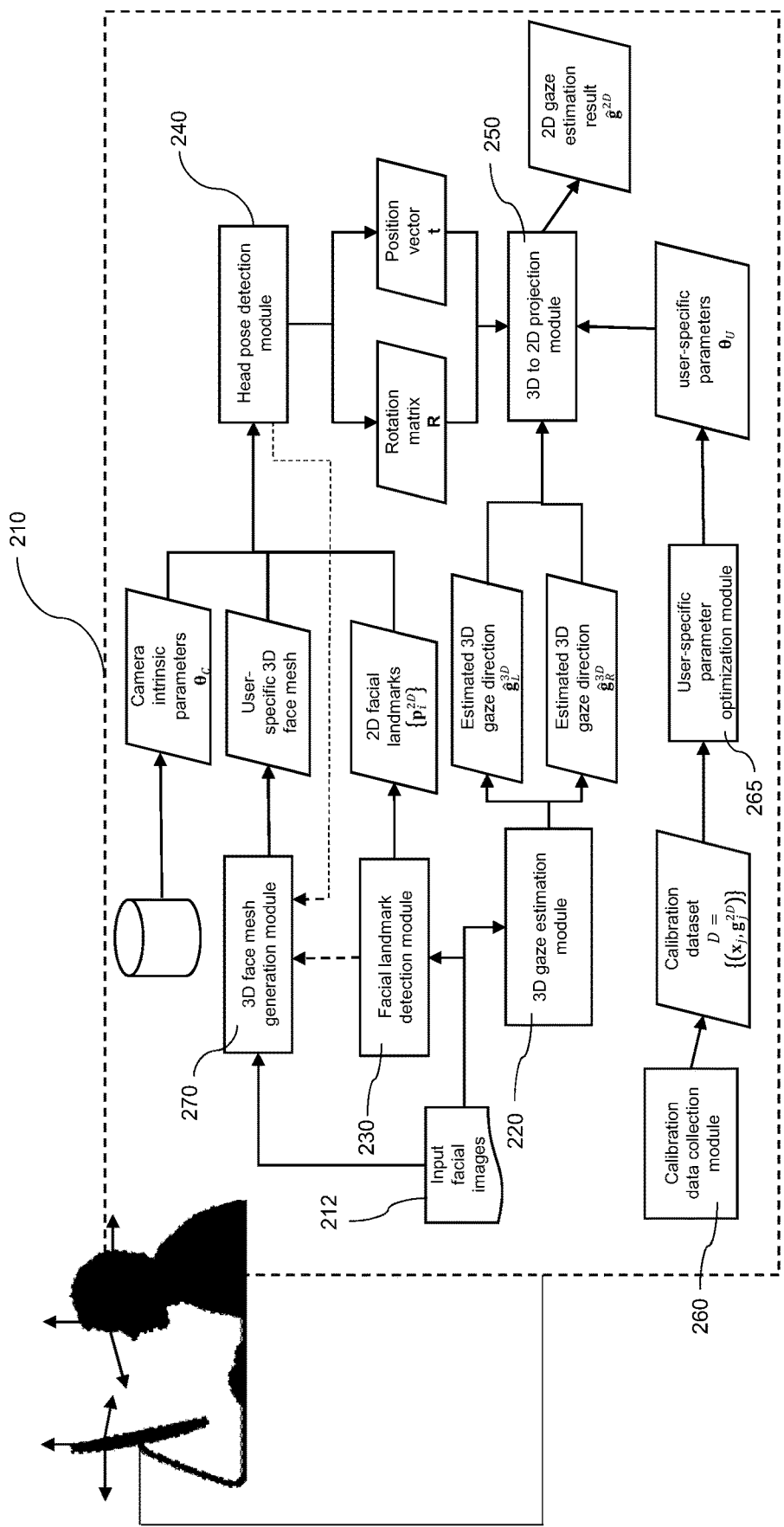
FIG. 8 is a schematic illustration of the data flow of a 2D on-screen user gaze estimation system, in accordance with an alternative embodiment of the present application.

Now referring to FIG. 8, there is shown an alternative embodiment of the system for performing 2D on-screen gaze estimation for a specific user (e.g. system 210), wherein the features are numbered with reference numerals in the 200 series which correspond to the reference numerals of the previous embodiment. In the alternative embodiment shown in FIG. 8, the 3D gaze estimation module 220 use binocular models and is therefore configured to receive the input facial image 212 of a user and to use a computer vision algorithm to process the data of the input facial image 212 to generate two 3D gaze estimation direction cep, $\{\hat{g}_L^{3D}, \hat{g}_R^{3D}\}$ corresponding respectively to the line of sight of the left eye and the right eye of the user in the input facial image 212. In this alternative embodiment, numerous elements are similar to the previously described embodiment and will not be repeated herein. For example, in this alternative embodiment, the 3D face mesh generation module 270, the facial landmark detection module 230 and the head pose detection module 240 operate similarly to the previously described embodiment where the 3D gaze estimation module 220 generates a single gaze estimation result and will not be described in more details herein.

In the embodiment shown in FIG. 8, the calibration data collection module 260 and user-specific parameter optimization module 265 are modules of the system 210 and again operate to generate the set of user-specific parameters $\theta_U$ which will subsequently be used by the 3D to 2D projection module 250 to improve the accuracy of the 2D coordinates conversion performed thereby, but generate an optimized set of user-specific parameters $\theta_U$ adapted to the binocular 3D gaze estimation direction $\{\hat{g}_L^{3D}, \hat{g}_R^{3D}\}$ as will be described in more details below.

The calibration data collection module 260 collecting the calibration dataset $D=\{(x_j, g_j^{2D})\}$ operate similarly to the previously described embodiment where the 3D gaze estimation module generates a single gaze estimation result and will not be described in more details herein.

The user-specific parameter optimization module 265 also determines the optimized user-specific parameters $\theta_U$ based on the collected calibration dataset D for the binocular 3D gaze estimation direction $\{\hat{g}_L^{3D}, \hat{g}_R^{3D}\}$. In this alternative embodiment, the set of user-specific parameters is defined as $\theta_U = \{s, k_\phi^L, b_\phi^L, k_\theta^L, b_\theta^L, k_\phi^R, b_\phi^R, k_\theta^R, b_\theta^R, x_O, y_O, z_O\}$, where s is still the scaling factor with respect to the user-specific 3D face mesh for calibrating the head size of the user, $k_\phi^L, b_\phi^L, k_\theta^L, b_\theta^L$ and $k_\phi^R, b_\phi^R, k_\theta^R, b_\theta^R$ each specify a linear transform to the estimated directions $\hat{g}_L^{3D}$ and $\hat{g}_R^{3D}$ in pitch and yaw angle form defined as $\hat{g}_L^{3D} = (\phi_g^L, \theta_g^L)$ and $\hat{g}_R^{3D} = (\phi_g^R, \theta_g^R)$ for the left eye and the right eye respectively, resulting in a user-specific 3D gaze direction defined as $\hat{g}_U^{3D}{}_L = (k_{\phi L}\phi_g^L + b_\phi^L, \ b_\phi^L, \ k_\theta^L \theta_g^L + b_\theta^L)$ and $\hat{g}_U^{3D}{}_R = (k_\phi^R \phi_g^R + b_\phi^R, k_\theta^R \theta_g^R + b_\theta^R)$ for the left eye and the right eye respectively, with $(-x_O, y_O, z_O)$ and $(-x_O, y_O, z_O)$ specify the coordinates of the HCS for the left eye and the right eye respectively, (i.e. the starting points of the left and right 3D gaze estimation direction $\{\hat{g}_L^{3D}, \hat{g}_R^{3D}\}$ projection are defined as $(x_O, y_O, z_O)$ and $(-x_O, y_O, z_O)$ respectively).

The user-specific parameter optimization module 265 is again configured to divide the calibration dataset D between the training dataset $D_T$ and validation dataset $D_V$ as described above, whenever a new sample is added to the calibration dataset D and the number of calibration samples in the calibration dataset exceeds two and performs minimization of the loss function for the calibration dataset D, to determine the best set of user-specific parameters $\theta_U$ similarly as described above, but using initialization values of: $s=k_*{}^*=1$, $b_*{}^*=y_O=z_O=0$, $x_O=\frac{1}{2}(|x_{eye}^L|+|x_{eye}^R|)$, where $x_{eye}^*$ is the X coordinate of the center of the corresponding one of the left or the right eye in the HCS.

The 3D to 2D projection module 250 converts each one of the estimated 3D gaze directions $\hat{g}_L^{3D}$ and $\hat{g}_R^{3D}$ generated by the 3D gaze estimation module 220 into a 2D gaze estimation result $\hat{g}^{2D}$ defining coordinates in the coordinate system of the display screen. The 3D to 2D projection module 250 performs the conversion of each one of the estimated 3D gaze $\hat{g}_L^{3D}$ and $\hat{g}_R^{3D}$ similarly to the above described embodiment, but taking account the parameters of the corresponding eye in the set of user-specific parameters $\theta_U$, such that the adjusted coordinates of the intersection point G for each eye (with L identifying the left eye and R identifying the right eye) according to the set of user-specific parameters $\theta_U$ is defined by:

$$G^* = \left(x_t^* - \frac{z_t^*}{z_g^*}x_g^*, y_t^* - \frac{z_t^*}{z_g^*}y_g^U, 0\right), * \in \{L, R\}$$

where:

$(x_t^L, y_t^L, z_t^L) = st + R(x_O, y_O, z_O)^T$ $(x_t^R, y_t^R, z_t^R) = st + R(-x_O, y_O, z_O)^T$ $x_g^U = \cos(k_\phi * \phi_g * + b_\phi *)\sin(k_\theta * \theta_g * + b_\theta *)$ $y_g^U = \sin(k_\phi * \phi_g * + b_\phi *)$ $z_g^U = \cos(k_\phi * \phi_g * + b_\phi *)\cos(k_\theta * \theta_g * + b_\theta *)$.

The 3D to 2D projection module 250 converts the coordinates of each one of the intersection points in the CCS $G^L$ and $G^R$, into a corresponding 2D gaze estimation result $\hat{g}_L^{2D}$ and $\hat{g}_R^{2D}$ similarly to the previous embodiment, using parameters of the display screen including the size of the display screen, the resolution of the display screen and the coordinate of a corner of the display screen, such that the details will not be repeated herein. The 3D to 2D projection module 250 finally, defines the coordinates of an overall intersection point being the 2D gaze estimation result $\hat{g}^{2D}$ from the coordinates of the intersection point for the left eye and the right eye $\hat{g}_L^{2D}$ and $\hat{g}_R^{2D}$. In an embodiment, the coordinates of the overall intersection point defining the 2D gaze estimation result $\hat{g}^{2D}$ are defined as the midpoint between the left eye 2D gaze estimation result $\hat{g}_L^{2D}$ the right eye 2D gaze estimation result $\hat{g}_R^{2D}$.

One skilled in the art will understand that the present application also covers a computer implemented method including the steps described above in connection with the operation of the above-described system (i.e. the steps being performed by the components or modules of the above-described system for performing the gaze estimation using the input facial image of the user captured using the camera associated with the processing device). The present application also covers a non-transitory computer readable medium having instructions stored thereon which, when executed by a processor, cause the processor to carry out the steps of the proposed method.

Figure 9:
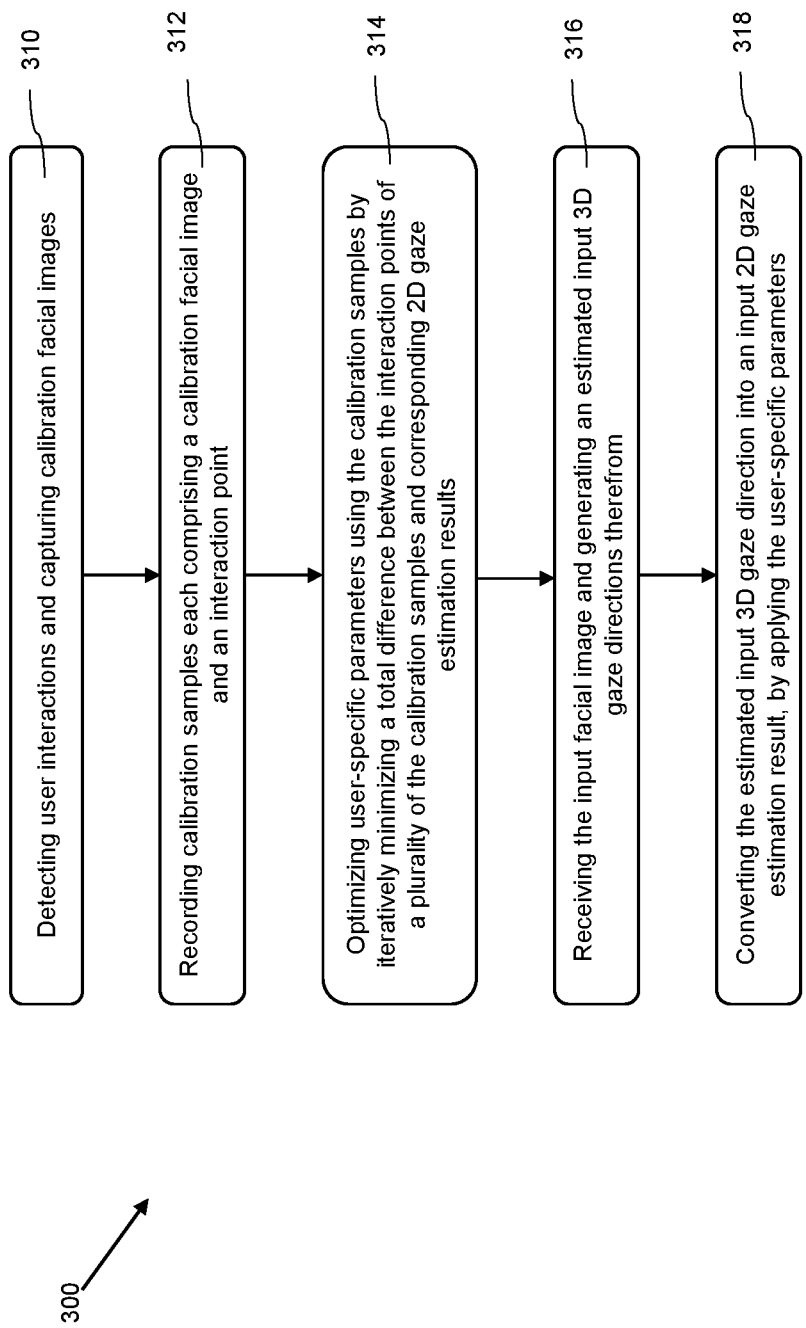
FIG. 9 is a flowchart of a 2D on-screen user gaze estimation method, in accordance with an embodiment of the present application.

With reference to FIG. 9, an embodiment of a computer implemented method for gaze estimation performed by a processing device is shown. The computer implemented method for gaze estimation may be carried out by routines or subroutines of software that includes instructions that are executable, for example, by one or more processors of a processing device, such as processing device 116. The routines or subroutines of the software may include actions or operations performed by the computer implemented method for gaze estimation. Coding of software for implementing the computer implemented method for gaze estimation is well within the skill of a person of ordinary skill in the art having regard to the present description. The computer implemented method for gaze estimation may include additional or fewer operations than shown and described and may be performed in a different order. Computer-readable code or instructions executable by, for example, one or more processors of a processing device may be stored in a computer-readable medium.

In the embodiment shown, the computer implemented method for gaze estimation (referred to hereinafter as method 300) includes the operations 310, 312 and 314 for performing automatic calibration and generating optimized user parameters for the user. In more details, the method includes operation 310 of detecting user interactions with the display and capturing calibration facial images of the user each corresponding to a detected user interaction, using the camera and operation 312 of recording calibration samples each comprising a calibration facial image and an interaction point corresponding to a point on the display where the user interaction was detected when the calibration image was captured. These steps therefore allow a calibration dataset to be populated with the calibration samples. The method also includes operation 314 of optimizing the user-specific parameters using the calibration samples of the calibration dataset, by iteratively minimizing a total difference between the interaction points of a plurality of the calibration samples and corresponding 2D gaze estimation results obtained by using the user-specific parameters to convert calibration 3D gaze directions estimated from corresponding calibration facial images of the plurality of calibration samples.

In an embodiment, the calibration dataset can be divided between a training dataset and a validation dataset and the step of minimizing the total difference between the interaction points of the plurality of the calibration samples and corresponding 2D gaze estimation results can be performed by iteratively minimizing the total difference between the interaction points of the calibration samples and corresponding 2D gaze estimation results of the training dataset and terminating the iterations when the difference between the interaction points of the calibration samples and corresponding 2D gaze estimation results of the validation dataset no longer decreases. One skilled in the art will understand that the details provided above regarding the user-specific parameters and the loss function used for optimizing the user-specific parameters apply to the present method and need not be repeated herein.

The method also includes operation 316 of generating an estimated input 3D gaze directions from an input facial image captured using the camera of the processing device and operation 318 of converting the estimated input 3D gaze direction into an input 2D gaze estimation result corresponding to a user's estimated point of regard on the display, for the input facial image, by applying the user-specific parameters. This therefore results in a conversion having a greater accuracy for the user, as it is adapted to specificities of the user, as defined by the user-specific parameters.

One skilled in the art will understand that the operation of the method 300 indicated above are not limitative and the method 300 can include additional operations. For example, additional operation defined above for the operation of the system 110 can be included in the method 300, not all of the possible operations being repeated herein for ease of description and to avoid unnecessary repetitions.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A system, comprising:
   at least one processor; and
   a non-transitory computer readable storage medium storing programming, the programming including instructions that, when executed by the at least one processor, cause the system to perform operations including:
      estimating a 3D gaze direction from one of an input facial image of a user, the input facial image captured using a camera associated with a processing device having a display and a calibration facial image;
      using user-specific parameters to convert the estimated 3D gaze direction into a 2D gaze estimation result corresponding to a user's estimated point of regard (POR) on the display, the 2D gaze estimation result including an estimated 2D coordinate point;
      recording calibration samples, each calibration sample including a corresponding calibration facial image of the user and an interaction point corresponding to a point on the display where an occurrence of a user interaction was detected when the corresponding calibration facial image was captured;
      calibrating the user-specific parameters using the calibration samples by iteratively minimizing a total difference between interaction points of the calibration samples and estimated 2D coordinate points of corresponding 2D gaze estimation results obtained by using the user-specific parameters to convert calibration 3D gaze directions estimated from corresponding calibration facial images of the calibration samples; and
      including one or more of the calibration samples in a training dataset and one or more of the calibration samples in a validation dataset, and wherein the iteratively minimizing the total difference between the interaction points of the calibration samples and the estimated 2D coordinate points of the corresponding 2D gaze estimation results includes:
         iteratively minimizing the total difference between the interaction points of the calibration samples and the estimated 2D coordinate points of the corresponding 2D gaze estimation results of the training dataset in iterations.

2. The system of claim 1, wherein the iteratively minimizing the total difference between the interaction points of the calibration samples and the estimated 2D coordinate points of the corresponding 2D gaze estimation results includes:
   terminating the iterations when the total difference between the interaction points of the calibration samples and the estimated 2D coordinate points of the corresponding 2D gaze estimation results of the validation dataset no longer decreases.

3. The system of claim 2, the operations further comprising:
   populating a calibration dataset with the recorded calibration samples;
   partitioning the calibration dataset into the training dataset and the validation dataset, the calibration dataset being portioned into the training dataset and the validation dataset to update the training dataset and the validation dataset when a new sample is added and a number of the calibration samples exceeds two; and
   updating the user-specific parameters upon an update of the training dataset and the validation dataset by repeating the iterations from an end of a last iteration performed for optimizing the user-specific parameters.

4. The system of claim 1, the operations further comprising:
   transmitting at least one of the user-specific parameters to a target processing device for optimizing the user-specific parameters using the calibration samples to minimize the iterations required for optimizing the user-specific parameters using the calibration samples on the target processing device.

5. The system of claim 1, wherein the user-specific parameters are defined as $\theta_U = \{k_\phi, b_\phi, k_\theta, b_\theta, s, y_O, z_O\}$, where s is a scaling factor, $k_\phi, b_\phi, k_\theta, b_\theta$ specify a linear transform to the estimated 3D gaze direction in pitch and yaw angle form defined as $\hat{g}^{3D} = (\phi_g, \theta_g)$ resulting in a user-specific estimated 3D gaze direction defined as $\hat{g}_U^{3D} = (k_\phi \phi_g + b_\phi, k_\theta \theta_g + b_\theta)$, and $(0, y_O, z_O)$ specify the coordinates of an origin of a head coordinate system (HCS) in which the head of the user is positioned in a corresponding one of the calibration facial images.

6. The system of claim 5, wherein the total difference between the interaction points of the plurality of the calibration samples and the estimated 2D coordinate points of the corresponding 2D gaze estimation results is defined by a loss function, defined as:

$$L(D_T; \theta_U) \triangleq \sum_{(x, g^{2D}) \in D_T} \|\hat{g}^{2D}(x; \theta_U) - g^{2D}\|_2^2$$

and $$L(D_V; \theta_U) \triangleq \sum_{(x, g^{2D}) \in D_V} \|\hat{g}^{2D}(x; \theta_U) - g^{2D}\|_2^2$$

for the training dataset ($D_T$) and the validation dataset ($D_V$) respectively, where $\hat{g}^{2D}(x; \theta_U)$ represents the 2D gaze estimation result calculated taking into account the user-specific parameters $\theta_U$ and $g^{2D}$ represents the corresponding interaction point location.

7. The system of claim 1, the operations further comprising:
for each one of a set of reference facial images:
processing the each one of the set of reference facial images and generate coordinates of a set of 3D facial landmarks; and
performing a series of linear transformation operations upon the coordinates of the set of 3D facial landmarks, the series of linear transformation operations including at least one of a translation, a rotation and a scaling of the set of 3D facial landmarks to generate normalized facial landmarks;
generating a user-specific 3D face mesh based on the normalized facial landmarks generated for the set of facial reference images; and
converting the estimated 3D gaze direction into the 2D gaze estimation result corresponding to the user's estimated POR on the display for the input facial image, by using a position vector and a rotation matrix of the user's head generated using the user-specific 3D face mesh.

8. The system of claim 7, the performing the scaling of the set of 3D facial landmarks includes:
applying a scaling factor corresponding to a value of a facial feature for the user determined from the set of 3D facial landmarks relative to an average value of the facial feature for an average human head, the scaling factor being determined at least by one of the value of an inter-pupillary distance (IPD) for the user relative to an average IPD for the average human head and the value of an iris diameter for the user relative to an average iris diameter of the average human head.

9. The system of claim 1, wherein the estimated 3D gaze direction includes two estimated gaze directions $\{\hat{g}_L^{3D}, \hat{g}_R^{3D}\}$ corresponding to a left eye and a right eye of the user respectively, the operations further comprising:
determining the 2D gaze estimation result based on a combination of the estimated gaze directions corresponding to the left eye and the right eye of the user.

10. The system of claim 9, wherein the user-specific parameters are defined as $\theta_U=\{s, k_\phi^L, b_\phi^L, k_\theta^L, b_\theta^L, k_\phi^R, b_\phi^R, k_\theta^R, b_\theta^R, x_O, y_O, z_O\}$, where s is a scaling factor, $k_\phi^L, b_\phi^L, k_\theta^L, b_\theta^L$ and $k_\phi^R, b_\phi^R, k_\theta^R, b_\theta^R$ each specify a linear transform to the corresponding estimated gaze direction in pitch yaw form defined as $\hat{g}_L^{3D}=(\phi_g^L, \theta_g^L)$ and $\hat{g}_R^{3D}=(\phi_g^R, \theta_g^R)$ for the left eye and the right eye respectively, resulting in a user-specific 3D gaze direction defined as $\hat{g}_U^{3D}{}_L=(k_{\phi L}\phi_g^L+b_\phi^L, k_\theta^L\theta_g^L+b_\theta^L)$ and $\hat{g}_U^{3D}{}_R=(k_\phi^R\phi_g^R+b_\phi^R, k_\theta^R\theta_g^R+b_\theta^R)$ for the left eye and the right eye respectively, and $(x_O,y_O,z_O)$ and $(-x_O,y_O,z_O)$ specify the coordinates of an origin of a head coordinate system (HCS) in which the head of the used is positioned in a corresponding one of the calibration facial image for the left eye and the right eye respectively.

11. A method, comprising:
detecting user interactions with a display of a processing device and capturing calibration facial images of a user using a camera associated with the processing device, each corresponding calibration facial image of the calibration facial images corresponding to a detected user interaction;
recording calibration samples, each sample comprising a corresponding calibration facial image of the calibration facial images and an interaction point corresponding to a point on the display where the user interaction is detected when a calibration image is captured;
calibrating user-specific parameters using the calibration samples by iteratively minimizing a total difference between interaction points of the calibration samples and estimated 2D coordinate points of corresponding 2D gaze estimation results obtained by using the user-specific parameters to convert calibration 3D gaze directions estimated from corresponding calibration facial images of the calibration samples;
receiving an input facial image of the user, the input facial image captured using the camera and generating an estimated input 3D gaze direction therefrom;
converting the estimated input 3D gaze direction into an input 2D gaze estimation result corresponding to a user's estimated point of regard (POR) on the display for the input facial image, by applying the user-specific parameters, the input 2D gaze estimation result including an estimated 2D coordinate point; and
including one or more of the calibration samples into a training dataset and one or more of the calibration samples into a validation dataset, and wherein the iteratively minimizing the total difference between the interaction points of the calibration samples and the estimated 2D coordinate points of the corresponding 2D gaze estimation results includes:
iteratively minimizing the total difference between the interaction points of the calibration samples and the estimated 2D coordinate points of the corresponding 2D gaze estimation results of the training dataset in the iterations.

12. The method of claim 11,
wherein the iteratively minimizing the total difference between the interaction points of the calibration samples and the estimated 2D coordinate points of the corresponding 2D gaze estimation results includes:
terminating the iterations when the total difference between the interaction points of the calibration samples and the estimated 2D coordinate points of the corresponding 2D gaze estimation results of the validation dataset no longer decreases.

13. The method of claim 12, further comprising:
populating a calibration dataset with the recorded calibration samples;
partitioning the calibration dataset into the training dataset and the validation dataset to update the training dataset and the validation dataset when a new sample is added and a number of the calibration samples exceeds two; and
updating the user-specific parameters upon an update of the training dataset and the validation dataset by repeating the iterations from an end of a last iteration performed for optimizing the user-specific parameters.

14. The method of claim 11, further comprising:
transmitting at least one of the user-specific parameters to a target processing device for optimizing the user-specific parameters using the calibration samples to minimize the iterations required for optimizing the user-specific parameters using the calibration samples on the target processing device.

15. The method of claim 11, wherein the user-specific parameters are defined as $\theta_U=\{k_\phi, b_\phi, k_\theta, b_\theta, s, y_O, z_O\}$, where s is a scaling factor, $k_\phi, b_\phi, k_\theta, b_\theta$ specify a linear transform to the estimated 3D gaze direction in pitch and yaw angle form defined as $\hat{g}^{3D}=(\phi_g, \theta_g)$ resulting in a user-specific estimated 3D gaze direction defined as $\hat{g}_U^{3D}=(k_\phi\phi_g+b_\phi, k_\theta\theta_g+b_\theta)$, and $(0, y_O, z_O)$ specify the coordinates of an origin of a head coordinate system (HCS) in which the head of the used is positioned in a corresponding one of the calibration facial images.

16. The method of claim 15, wherein the total difference between the interaction points of the plurality of calibration samples and the estimated 2D coordinate points of the corresponding 2D gaze estimation results is defined by a loss function, defined as:

$$L(D_T; \theta_U) \triangleq \sum_{(x, g^{2D}) \in D_T} \|\hat{g}^{2D}(x; \theta_U) - g^{2D}\|_2^2$$

and $$L(D_V; \theta_U) \triangleq \sum_{(x, g^{2D}) \in D_V} \|\hat{g}^{2D}(x; \theta_U) - g^{2D}\|_2^2$$

for the training dataset ($D_T$) and the validation dataset ($D_r$) respectively, where $\hat{g}^{2D}(x; \theta_U)$ represents the 2D gaze estimation result calculated taking into account the user-specific parameters $\theta_U$ and $g^{2D}$ represents the corresponding interaction point location.

17. The method of claim 11, further comprising:
for each one of a set of reference facial images:
  processing the each one of the set of reference facial images and generating coordinates of a set of 3D facial landmarks; and
  performing a series of linear transformation operations upon the coordinates of the set of 3D facial landmarks, the series of linear transformation operations including at least one of a translation, a rotation and a scaling of the set of 3D facial landmarks to generate normalized facial landmarks;
generating a user-specific 3D face mesh based on the normalized facial landmarks generated for the set of facial reference images; and
converting the estimated input 3D gaze direction into the input 2D gaze estimation result corresponding to the user's estimated POR point of regard on the display for the input facial image, by using a position vector and a rotation matrix of the user's head generated using the user-specific 3D face mesh.

18. The method of claim 17, the performing the scaling of the set of 3D facial landmarks includes:
  applying a scaling factor corresponding to a value of a facial feature for the user determined from the set of 3D facial landmarks relative to an average value of the facial feature for an average human head, the scaling factor being determined at least by one of the value of an inter-pupillary distance (IPD) for the user relative to an average IPD for the average human head and the value of an iris diameter for the user relative to an average iris diameter for the average human head.

19. The method of claim 11, wherein the receiving the input facial image and the generating the estimated input 3D gaze direction comprise:

generating two estimated gaze directions $\{\hat{g}_L^{3D}, \hat{g}_R^{3D}\}$ corresponding to a left eye and a right eye of the user respectively, and wherein the converting the estimated input 3D gaze direction into an input 2D gaze estimation result comprises:
  converting the two estimated gaze directions $\{\hat{g}_L^{3D}, \hat{g}_R^{3D}\}$ into a left eye input 2D gaze estimation result and a right eye input 2D gaze estimation result; and
  generating the 2D gaze estimation result from the combination of the left eye input 2D gaze estimation result and the right eye input 2D gaze estimation result.

20. A non-transitory computer readable medium having instructions stored thereon which, when executed by at least one processor, cause the at least one processor to perform operations including:
  detecting user interactions with a display of a processing device and capturing calibration facial images of a user using a camera associated with the processing device, each corresponding calibration facial image of the calibration facial images corresponding to a detected user interaction;
  recording calibration samples, each sample comprising a corresponding calibration facial image of the calibration facial images and an interaction point corresponding to a point on the display where the user interaction is detected when a calibration image is captured;
  calibrating user-specific parameters using the calibration samples by iteratively minimizing a total difference between interaction points of the calibration samples and estimated 2D coordinate points of corresponding 2D gaze estimation results obtained by using the user-specific parameters to convert calibration 3D gaze directions estimated from corresponding calibration facial images of the calibration samples;
  receiving an input facial image of the user captured using the camera and generating an estimated input 3D gaze direction therefrom; and
  converting the estimated input 3D gaze direction into an input 2D gaze estimation result corresponding to a user's estimated point of regard (POR) on the display for the input facial image, by applying the user-specific parameters, the input 2D gaze estimation result including an estimated 2D coordinate point; and
  including one or more of the calibration samples into a training dataset and one or more of the calibration samples into a validation dataset, and wherein the iteratively minimizing the total difference between the interaction points of the calibration samples and the estimated 2D coordinate points of the corresponding 2D gaze estimation results includes:
  iteratively minimizing the total difference between the interaction points of the calibration samples and the estimated 2D coordinate points of the corresponding 2D gaze estimation results of the training dataset in the iterations.

* * * * *

UNITED STATES PATENT AND TRADEMARK OFFICE
CERTIFICATE OF CORRECTION

PATENT NO. : 11,630,510 B2
APPLICATION NO. : 17/304615
DATED : April 18, 2023
INVENTOR(S) : Li et al.

It is certified that error appears in the above-identified patent and that said Letters Patent is hereby corrected as shown below:

In the Claims

Claim 10, Column 25, Line 44; delete "claim9" and insert --claim 9--.

Claim 17, Column 27, Line 40; delete "point of regard".

Signed and Sealed this
Twenty-third Day of May, 2023

Katherine Kelly Vidal
Director of the United States Patent and Trademark Office